(12) United States Patent
Ochiai et al.

(10) Patent No.: US 7,633,594 B2
(45) Date of Patent: Dec. 15, 2009

(54) LIQUID CRYSTAL DISPLAY DEVICE WITH ORIENTATION CONTROL PROJECTION HAVING LIGHT SHIELDING

(75) Inventors: Takahiro Ochiai, Chiba (JP); Tohru Sasaki, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 233 days.

(21) Appl. No.: 11/654,594

(22) Filed: Jan. 18, 2007

(65) Prior Publication Data
US 2007/0182903 A1 Aug. 9, 2007

(30) Foreign Application Priority Data
Feb. 8, 2006 (JP) ............... 2006-031171

(51) Int. Cl.
*G02F 1/1339* (2006.01)
*G02F 1/1333* (2006.01)
*G02F 1/1337* (2006.01)

(52) U.S. Cl. ............ 349/155; 349/110; 349/129

(58) Field of Classification Search ........... 349/106, 349/110, 111, 156, 123, 124, 128, 129
See application file for complete search history.

(56) References Cited

U.S. PATENT DOCUMENTS

| | | | |
|---|---|---|---|
| 6,573,964 B1 * | 6/2003 | Takizawa et al. | 349/129 |
| 6,671,025 B1 * | 12/2003 | Ikeda et al. | 349/156 |
| 2001/0040656 A1 * | 11/2001 | Na et al. | 349/110 |
| 2003/0202145 A1 * | 10/2003 | Takizawa et al. | 349/129 |
| 2005/0128396 A1 | 6/2005 | Tsuchiya et al. | |

FOREIGN PATENT DOCUMENTS

| | | |
|---|---|---|
| JP | 11-202338 | 1/1998 |
| JP | 2005-173105 | 12/2003 |

* cited by examiner

*Primary Examiner*—David Nelms
*Assistant Examiner*—Hoan C Nguyen
(74) *Attorney, Agent, or Firm*—Stites & Harbison PLLC; Juan Carlos A. Marquez, Esq.

(57) ABSTRACT

The present invention lowers leaking of light at the time of performing a black display of VA-type liquid crystal display device and, at the same time, prevents lowering of a numerical aperture. In a liquid crystal display device having a liquid crystal display panel which sandwiches a liquid crystal material between a first substrate having a pixel electrode and a second substrate having a counter electrode, the second substrate includes an orientation control projection which is formed by forming a conductive film on the second substrate, by forming an insulation film on the conductive film and, thereafter, by patterning the insulation film, and a light shielding layer which is formed by patterning the conductive film using the orientation control projection as a mask.

5 Claims, 24 Drawing Sheets

LIQUID CRYSTAL DISPLAY DEVICE WITH ORIENTATION CONTROL PROJECTION HAVING LIGHT SHIELDING

The present application claims priority from Japanese application JP2006-031171 filed on Feb. 8, 2006, the content of which is hereby incorporated by reference into this application.

BACKGROUND OF THE INVENTION

1. Field of the Invention

The present invention relates to a liquid crystal display device, and more particularly to a technique which is effectively applicable to a VA (Vertical Alignment)-type liquid crystal display device.

2. Description of the Related Art

Conventionally, as one of the liquid crystal display devices, a VA-type liquid crystal display device has been known. In the VA-type liquid crystal display device, when a voltage is an OFF level, that is, when a potential difference between pixel electrodes and counter electrodes (also referred to as common electrodes) is 0, liquid crystal molecules are oriented perpendicular to a planar surface of a substrate, while when the voltage assumes a maximum value, the liquid crystal molecules are oriented parallel to the planar surface of a substrate. Further, in the VA-type liquid crystal display device, a black display is performed when the voltage is turned off and a white display is performed when the voltage assumes the maximum value.

Further, in the VA-type liquid crystal display device, to enhance a viewing angle characteristic, an orientation division technique (multi-domain) of liquid crystal molecules is incorporated in many cases. The orientation division technique is a technique which divides a liquid crystal layer into small regions and changes the direction that the liquid crystal molecules is oriented in response to a voltage for every small region. That is, the liquid crystal molecules are inclined to the right in one region and the liquid crystal molecules are inclined to the left in another region. Accordingly, a light quantity of the whole screen is averaged thus largely suppressing a color change attributed to a viewing angle.

The principle of the orientation division technique is, for example, that when the voltage assumes an OFF level, the orientation of the liquid crystal molecules in a boundary between respective small regions is not arranged perpendicular to the planar surface of the substrate but is arranged in an inclined state with respect to a certain direction. As a specific method for controlling the direction that the liquid crystal molecules are inclined, for example, a method which applies the linear polarized light radiation treatment (see patent document 1, for example) and a method which forms orientation control projections (see patent document 2, for example) are named.

However, when the above-mentioned orientation division technique is applied to the liquid crystal display device, for example, in the region where the orientation control projections are present, when the voltage assumes an OFF level, the liquid crystal molecules are present in a state the liquid crystal molecules are inclined in the certain direction without being inclined perpendicular to the planar surface of the substrate. Accordingly, there arises a drawback that leaking of light is generated in the region where the orientation control projections are arranged thus lowering a black contrast.

To cope with such a drawback, in the above-mentioned patent document 1, leaking of light is lowered by shielding portions which have a plurality of tilting angles (inclination angles) from light with a light shielding pattern. Further, in the above-mentioned patent document 2, a light shielding film is formed at a position which corresponds to an orientation restricting means (orientation control projections).

[Patent document 1] JP-A-11-202338
[Patent document 2] JP-A-2005-173105

SUMMARY OF THE INVENTION

However, in decreasing leaking of light during the black display using the above-mentioned light shielding pattern, it is necessary to increase the light shielding pattern by taking the orientation accuracy of the region in which the liquid crystal molecules are inclined and the light shielding pattern into an account when the voltage assumes the OFF level. Accordingly, there arises a drawback that a transmissive numerical aperture is lowered thus lowering the brightness of the liquid crystal display device.

It is an advantage of the present invention to provide a technique which can reduce leaking of light at the time of black display of a VA-type liquid crystal display device and, at the same time, can prevent lowering of the transmissive numerical aperture.

The above-mentioned and other advantages of the present invention and novel features will become apparent from the description and attached drawings of the present specification.

To briefly explain typical inventions among the inventions disclosed in this specification, they are as follows.

(1) In a liquid crystal display device having a liquid crystal display panel which sandwiches a liquid crystal material between a first substrate having a pixel electrode and a second substrate having a counter electrode, the second substrate includes an orientation control projection which is formed by forming a conductive film on the second substrate, by forming an insulation film on the conductive film and, thereafter, by patterning the insulation film, and a light shielding layer which is formed by patterning the conductive film using the orientation control projection as a mask.

(2) In the above-mentioned constitution (1), the liquid crystal display device is configured such that the orientation control projection and the light shielding layer are arranged between the counter electrode and the pixel electrode.

(3) In the above-mentioned constitution (1), the liquid crystal display device is configured such that the counter electrode is formed of a conductive film which is formed after patterning the light shielding layer.

(4) In the above-mentioned constitution (2) or (3), the liquid crystal display device is configured such that the light shielding layer has an outer periphery thereof as viewed from above a planar surface of the substrate arranged inside an outer periphery of the orientation control projection and, at the same time, a whole side surface of the outer periphery of the light shielding layer is not covered with the orientation control projection.

(5) In the above-mentioned constitution (2) or (3), the liquid crystal display device is configured such that the light shielding layer has an outer periphery thereof as viewed from above a planar surface of the substrate aligned with an outer periphery of the orientation control projection or arranged outside the outer periphery of the orientation control projection.

(6) In the above-mentioned constitution (4) or (5), the liquid crystal display device is configured such that the outer periphery of the light shielding layer is spaced apart from the outer periphery of the orientation control projection with a substantially fixed distance therebetween at respective points of the outer periphery of the light shielding layer.

(7) In any one of the above-mentioned constitutions (1) to (6), the liquid crystal display device is configured such that the second substrate has a step forming layer which forms two thicknesses as a thickness of a layer of the liquid crystal material between the counter electrode and the pixel electrode, the orientation control projection and the light shielding layer pass an end portion of the step forming layer and extend over two regions which differ in the thickness of the layer of the liquid crystal material.

(8) In any one of the above-mentioned constitutions (1) to (7), the liquid crystal display device is configured such that in the liquid crystal display panel, when a potential difference between the pixel electrode and the counter electrode is 0 (zero), liquid crystal molecules in the liquid crystal material are oriented in the direction perpendicular to a planar surface of the substrate.

(9) In a liquid crystal display device having a liquid crystal display panel which sandwiches a liquid crystal material between a first substrate having a pixel electrode and a second substrate having a counter electrode, the first substrate includes an orientation control projection which is formed by forming a conductive film on the second substrate, by forming an insulation film on the conductive film and, thereafter, by patterning the insulation film, and a light shielding layer which is formed by patterning the conductive film using the orientation control projection as a mask.

(10) In the above-mentioned constitution (9), the liquid crystal display device is configured such that the orientation control projection and the light shielding layer are arranged between the pixel electrode and the counter electrode.

(11) In the above-mentioned constitution (9), the liquid crystal display device is configured such that the pixel electrode is formed of a conductive film which is formed after patterning the light shielding layer.

(12) In the above-mentioned constitution (10) or (11), the liquid crystal display device is configured such that the light shielding layer has an outer periphery thereof as viewed from above a planar surface of the substrate arranged inside an outer periphery of the orientation control projection and, at the same time, a whole side surface of the outer periphery of the light shielding layer is not covered with the orientation control projection.

(13) In the above-mentioned constitution (10) or (11), the liquid crystal display device is configured such that the light shielding layer has an outer periphery thereof as viewed from above a planar surface of the substrate aligned with an outer periphery of the orientation control projection or arranged outside the outer periphery of the orientation control projection.

(14) In the above-mentioned constitution (12) or (13), the liquid crystal display device is configured such that the outer periphery of the light shielding layer is spaced apart from the outer periphery of the orientation control projection with a substantially fixed distance therebetween at respective points of the outer periphery of the light shielding layer.

(15) In any one of the above-mentioned constitutions (9) to (14), the liquid crystal display device is configured such that in the liquid crystal display panel, when a potential difference between the pixel electrode and the counter electrode is 0 (zero), liquid crystal molecules in the liquid crystal material are oriented in the direction perpendicular to a planar surface of the substrate.

(16) In a liquid crystal display device which includes a liquid crystal display panel which sandwiches a liquid crystal material between a first substrate having a pixel electrode and a second substrate having a counter electrode, and the first substrate includes a step forming layer which forms two thicknesses as a thickness of a layer of the liquid crystal material between the counter electrode and the pixel electrode and a reflective layer which is arranged in a region where the reflective layer is overlapped to the step forming layer, the first substrate includes the step forming layer which is formed by forming a conductive film, by forming an insulation film on the conductive film and, thereafter, by patterning the insulation film, and a light shielding layer which is formed by patterning the conductive film using the step forming layer as a mask.

(17) In the above-mentioned constitution (16), the liquid crystal display device is configured such that the light shielding layer extends outside a region where the light shielding layer is overlapped to the step forming layer.

(18) In the above-mentioned constitution (16) or (17), the liquid crystal display device is configured such that in the liquid crystal display panel, when a potential difference between the pixel electrode and the counter electrode is 0 (zero), liquid crystal molecules in the liquid crystal material are oriented in the direction perpendicular to a planar surface of the substrate.

The liquid crystal display device of the present invention includes the orientation control projections and light shielding layers on one substrate of the liquid crystal display panel. The orientation control projection is a projection for controlling the direction that the liquid crystal molecules in the liquid crystal material are tilted. Further, the light shielding layer is provided for reducing leaking of light which occurs at a position where the orientation control projection is arranged. Further, in the liquid crystal display device of the present invention, after forming the orientation control projections on the conductive film, the conductive film is patterned using the orientation control projections as masks thus forming light shielding layer.

When the orientation control projections and the light shielding layers are formed in order of such steps, for example, it is possible to bring about a state in which the outer periphery of the light shielding layer as viewed from above the planar surface of the substrate is arranged inside the outer periphery of the orientation control projection and, at the same time, the whole side surface of the outer periphery of the light shielding layer is not covered with the orientation control projection. Further, after the formation of the light shielding layer, for example, by partially removing the orientation control projection by ashing or the like, it is possible to make the outer periphery of the light shielding layer as viewed from above the planar surface of the substrate aligned with the outer periphery of the orientation control projection or arranged outside the outer periphery of the orientation control projection. Still further, here, the patterning of the light shielding layer is generally performed by etching and hence, the outer periphery of the light shielding layer is spaced apart from the outer periphery of the orientation control projection with a substantially fixed distance at respective points of the outer periphery of the light shielding layer. Accordingly, in the liquid crystal display device of the present invention, the positional displacement is hardly generated between the orientation control projection and the light shielding layer.

Here, a size of the outer periphery of the light shielding layer necessary for preventing leaking of light which occurs in the region where the orientation control projection is arranged is, in general, depending on an angle of an inclined surface of the orientation control projection. Accordingly, a positional relationship between the outer periphery of the orientation control projection and the outer periphery of the light shielding layer may be determined in response to the angle of the inclined surface of the formed orientation control projection.

To consider a case in which the above-mentioned liquid crystal display device (liquid crystal display panel) is of a VA type, for example, when a potential difference between the pixel electrode and the counter electrode is 0 (zero), liquid crystal molecules in the inside of the liquid crystal material are oriented perpendicular to the planar surface of the substrate, while in the region where the orientation control projection is arranged, the liquid crystal molecules in the inside of the liquid crystal material are not arranged perpendicular to the planar surface of the substrate and assumes a state in which the liquid crystal molecules are inclined in the certain direction. Here, when there arises no positional displacement between the orientation control projection and the light shielding layer as in the case of the liquid crystal display device of the present invention, it is possible to reduce the size of the outer periphery of the light shielding layer as small as possible. Accordingly, leaking of light at the time of performing a black display can be reduced and, at the same time, lowering of a transmissive numerical aperture can be prevented.

In the liquid crystal display device of the present invention, the orientation control projections and the light shielding layers may be formed on either one of the substrate (second substrate) which includes the counter electrode and the substrate (first substrate) which includes the pixel electrodes.

Further, in forming the orientation control projections and the light shielding layers on the substrate having the counter electrode, the orientation control projections and the light shielding layers may be formed between the counter electrode and the pixel electrodes, that is, behind the counter electrode or in front of the counter electrode. In the same manner, in forming the orientation control projections and the light shielding layers on the substrate having the pixel electrodes, the orientation control projections and the light shielding layers may be formed between the pixel electrodes and the counter electrode, that is, behind the pixel electrodes or in front of the pixel electrodes.

Further, the liquid crystal display device of the present invention may be of a transmissive or a semi-transmissive. When the liquid crystal display device is of the semi-transmissive, the step forming layer which changes a thickness of the liquid crystal material layer between a transmissive region and a reflective region may be formed on either one of the substrate having the counter electrode and the substrate having the pixel electrodes. Here, the orientation control projections and the light shielding layers may also be formed on either one of these substrates. Here, when the orientation control projections and the light shielding layers are formed on the substrate having the pixel electrodes, for example, the orientation control projections which extend from the reflective region to the transmissive region are formed, and the orientation control projections are used as masks at the time of forming reflective layers formed in the reflective regions, it is possible to form the reflective layers which also function as a light shielding layer.

Further, the present invention is not limited to the formation of the orientation control projections in the VA-type liquid crystal display device and is also applicable to, for example, the formation of the orientation control projections in a homogeneously oriented ECB (Electrically Controlled Birefringence) type liquid crystal display device (liquid crystal display panel).

DESCRIPTION OF THE PREFERRED EMBODIMENTS

Hereinafter, the present invention is explained in detail in conjunction with embodiments by reference to the drawings. Here, in all the drawings for explaining the embodiments, parts having identical functions are given same numerals and their repeated explanation is omitted.

Embodiment 1

Figure 1:
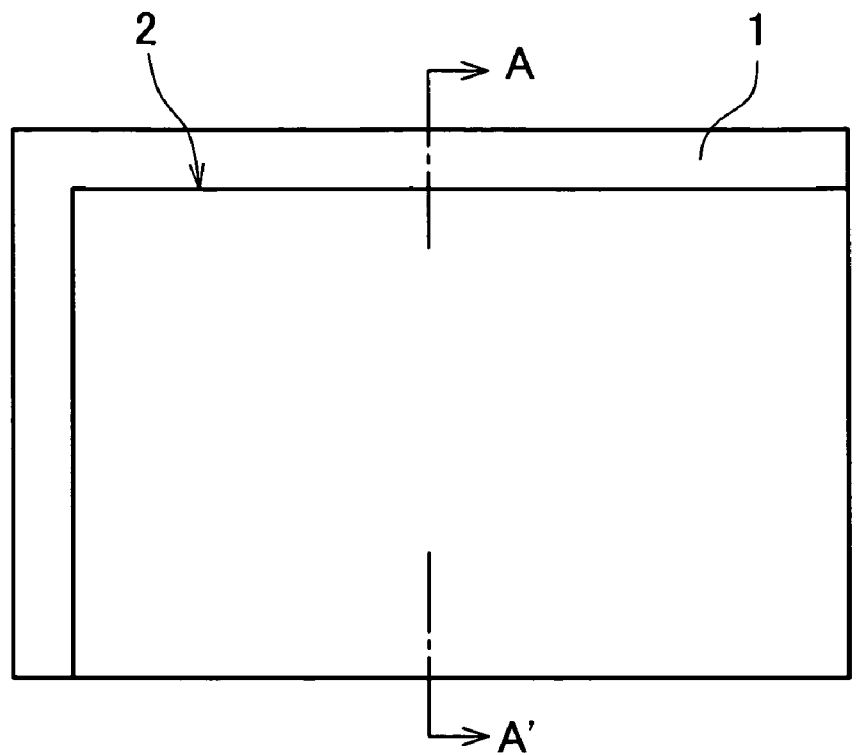
FIG. 1 is a plan view showing the schematic constitution of the liquid crystal display panel.
Figure 2:
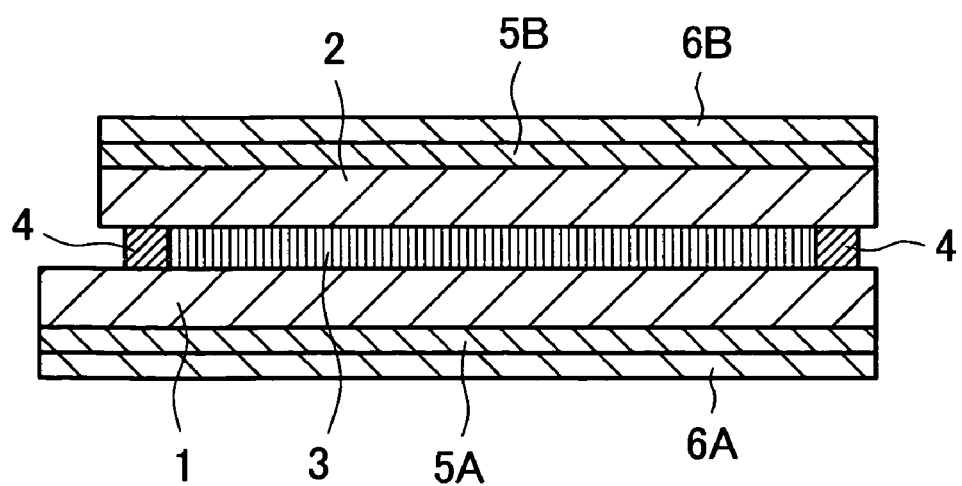
FIG. 2 is a cross-sectional view taken along a line A-A' in FIG. 1.
Figure 3:
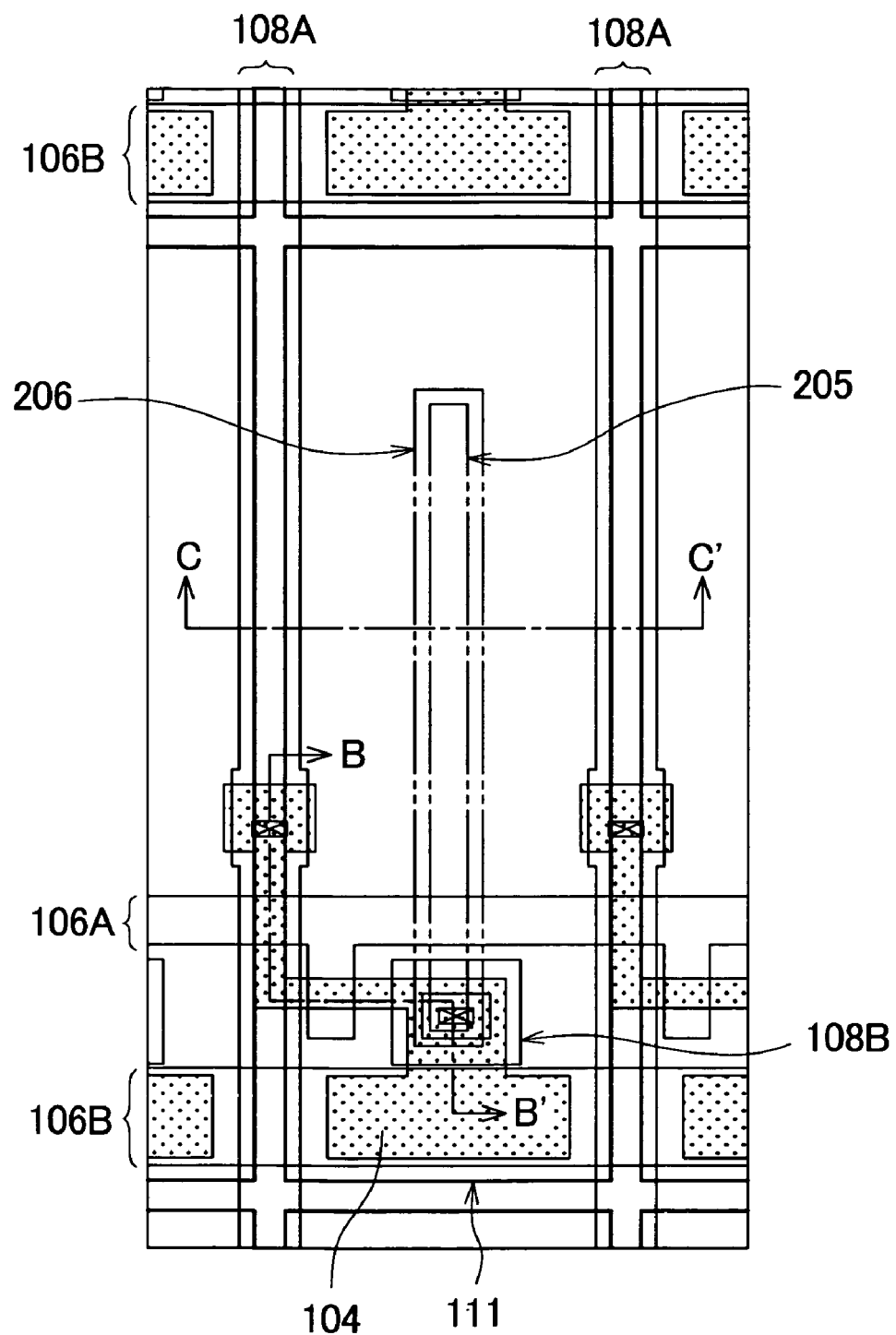
FIG. 3 is a plan view showing a constitutional example of one pixel of the liquid crystal display panel of an embodiment 1.
Figure 4:
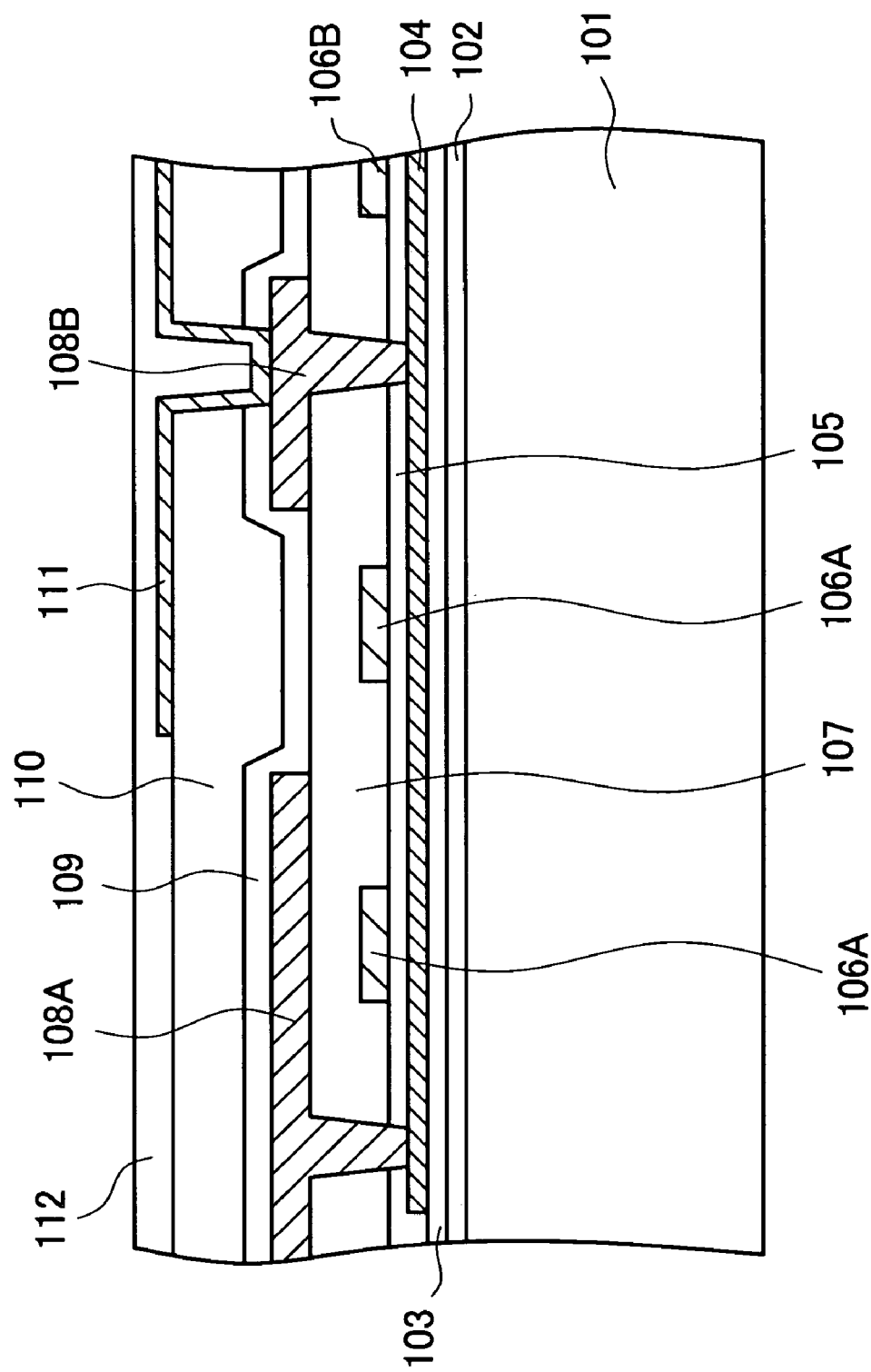
FIG. 4 is a cross-sectional view taken along a line B-B' in FIG. 3.
Figure 5:
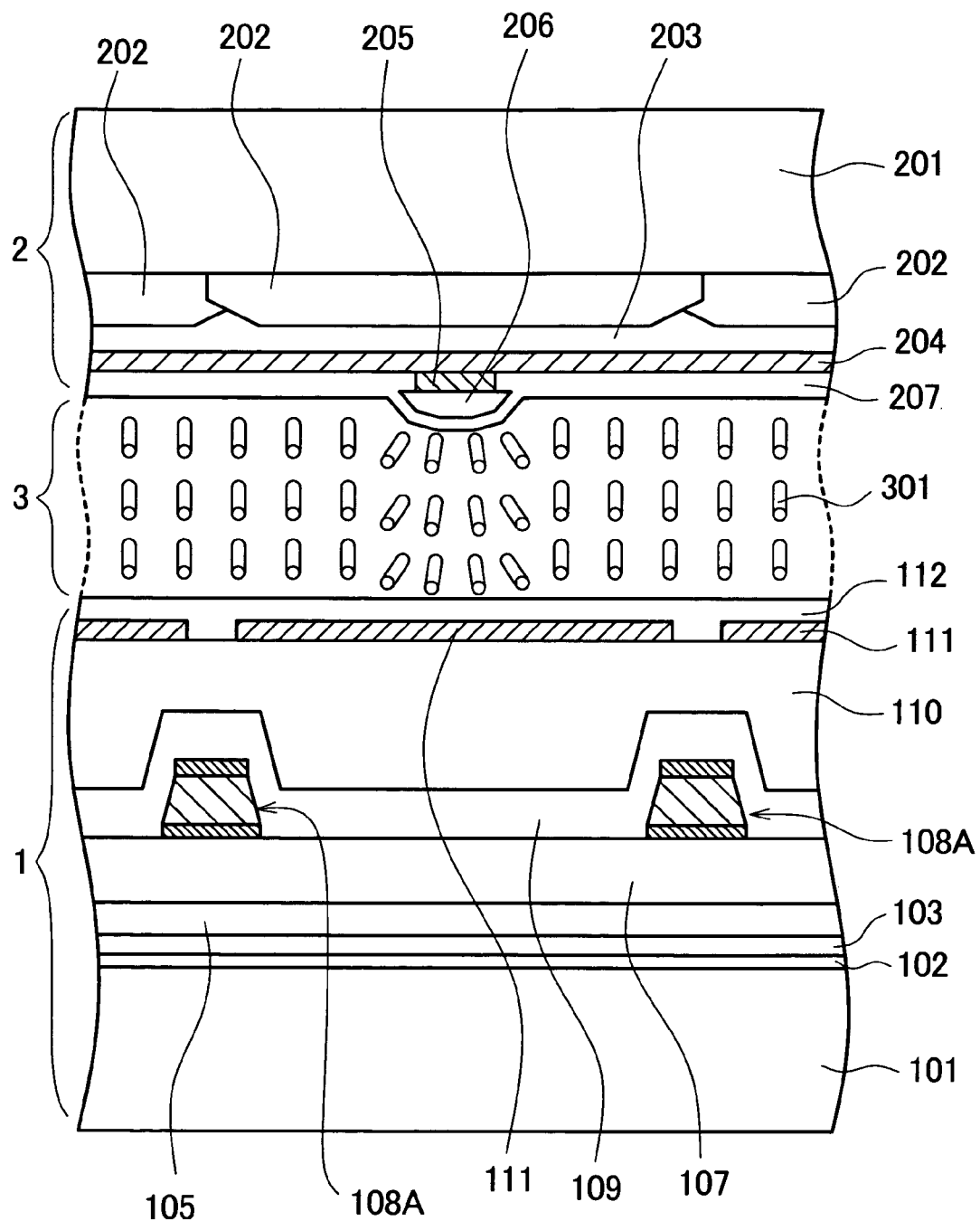
FIG. 5 is a cross-sectional view taken along a line C-C' in FIG. 3.

FIG. 1 to FIG. 5 are schematic views showing the schematic constitution of a liquid crystal display device of embodiment 1 according to the present invention, wherein FIG. 1 is a plan view showing the schematic constitution of a liquid crystal display panel, FIG. 2 is a cross-sectional view taken along a line A-A' in FIG. 1, FIG. 3 is a plan view showing a constitutional example of one pixel of the liquid crystal display panel of the embodiment 1, FIG. 4 is a cross-sectional view taken along a line B-B' in FIG. 3, and FIG. 5 is a cross-sectional view taken along a line C-C' in FIG. 3.

The liquid crystal display device of the embodiment 1 includes, as shown in FIG. 1 and FIG. 2, a liquid crystal display panel which sandwiches a liquid crystal material (a liquid crystal layer) 3 between a pair of substrates 1 and 2. Here, the pair of substrates 1 and 2 is adhered to each other using an annular sealing material 4, and the liquid crystal layer 3 is sealed in a space surrounded by the respective substrates 1, 2 and the sealing material 4.

Further, out of the pair of substrates 1 and 2, one substrate 1 is, for example, configured such that scanning signal lines (also referred to as gate signal lines), video signal lines (also referred to as drain signal lines), TFT elements, pixel electrodes, an orientation film and the like are formed on a surface of a glass substrate, and is referred to as a TFT substrate.

On the other hand, another substrate 2 is, for example, configured such that counter electrodes (also referred to as common electrodes), color filters, an orientation film and the like are formed on a surface of the glass substrate, and is referred to as a counter substrate.

Further, on a back surface of the TFT substrate 1 opposite to a surface which faces the counter substrate 2, for example, a phase difference plate 5A and a polarizer 6A are arranged. Still further, on a back surface of the counter substrate 2 opposite to a surface which faces the TFT substrate 1, a phase difference plate 5B and a polarizer 6B which make pairs with the phase difference plate 5A and the polarizer 6A of the TFT substrate 1 side are arranged. Hereinafter, the phase difference plate 5A and the polarizer 6A which are arranged on the TFT substrate 1 side are respectively referred to as the lowerphase difference plate and the lower polarizer, while the phase difference plate 5B and the polarizer 6B which are arranged on the counter substrate 2 side are respectively referred to as the upper phase difference plate and the upper polarizer.

Hereinafter, a constitutional example of one pixel in the liquid crystal display panel having such a constitution is explained. Here, in the embodiment 1, a case which adopts a VA-type transmissive color liquid crystal display panel is exemplified.

In the embodiment 1, one pixel of the liquid crystal display panel is, for example, configured as shown in FIG. 3 to FIG. 5. Here, FIG. 3 shows the constitution of one pixel of the TFT substrate 1. Further, FIG. 4 shows the cross-sectional constitution of the TFT substrate 1 taken along a line B-B' in FIG. 3. Still further, FIG. 5 shows the cross-sectional constitution of the TFT substrate 1, the counter substrate 2 and the liquid crystal layer 3 taken along a line C-C' in FIG. 3.

In the liquid crystal display panel of the embodiment 1, the TFT substrate 1 is, for example, constituted such that on the surface of the glass substrate 101, a semiconductor layer 104 is mounted by way of a first insulating layer 102 and a second insulating layer 103. The semiconductor layer 104 is, for example, formed by forming polysilicon (Poly-Si) film and by patterning the polysilicon. Further, on the semiconductor layer 104, the scanning signal line 106A and a holding capacity line 106B are formed by way of a third insulating layer 105. Here, the scanning signal line 106A is patterned such that a portion of the scanning signal line 106A is overlapped to the semiconductor layer 104 and the overlapping region functions as a gate of the TFT element.

Further, on the scanning signal line 106A and the holding capacity line 106B, the video signal line 108A and a source electrode 108B are mounted by way of a fourth insulating layer 107. The video signal line 108A is electrically connected to the semiconductor layer 104 via a through hole and functions as a drain of the TFT element. Further, the source electrode 108B is also electrically connected to the semiconductor layer 104 via a through hole and functions as a source of the TFT element.

Further, on the video signal line 108A and the source electrode 108B, a pixel electrode 111 is formed by way of a fifth insulating layer 109 and a sixth insulating layer 110. The pixel electrode 111 is electrically connected to the source electrode 108B via a through hole. Still further, on the pixel electrode 111, an orientation film 112 is mounted.

Further, one pixel in the TFT substrate 1 is a region which is surrounded by two neighboring video signal lines 108A and two neighboring scanning signal lines 106A, and this one-pixel constitution is two-dimensionally and periodically arranged on the TFT substrate 1.

Here, it is needless to say that the constitution of one pixel of the TFT substrate 1 shown in FIG. 3 to FIG. 5 is merely an example, and the constitution of one pixel is not limited to this example and one pixel may adopt other constitution.

On the other hand, the counter substrate 2 is, for example, configured such that color filters 202 are mounted on a surface of the glass substrate 201. In case of a color liquid crystal display panel, one pixel shown in FIG. 3 is referred to as a sub pixel and a plurality of sub pixels constitutes one dot of an image. Here, with respect to the color filters 202 formed on the counter substrate 2, for example, filters of red (R), green (G) and blue (B) are periodically arranged per sub pixel unit. Further, one dot is constituted of three sub pixels consisting of the sub pixel in which the red color filter is arranged, the sub pixel in which the green color filter is arranged, and a sub pixel in which the blue color filter is arranged. Further in this case, the color filter 202 of the respective colors may be, for example, separated from each other by a black matrix.

Further, on the color filter 202, a counter electrode (a common electrode) 204 is mounted by way of an overcoat layer 203. Further, on the counter electrode 204, an orientation control projection 206 is formed for every sub pixel by way of a light shielding layer 205. Still further, on the counter electrode 204 and the orientation control projection 206, an orientation film 207 is formed.

Here, in the liquid crystal display panel of the embodiment 1, for example, as shown in FIG. 3 and FIG. 5, an outer periphery of the light shielding layer 205 as viewed from a planar surface of the substrate is arranged inside an outer periphery of the orientation control projection 206. Further, the orientation control projection 206 is configured such that a region thereof which is formed between the outer periphery thereof and the outer periphery of the light shielding layer 205 is not brought into contact with the counter electrode 204 and an orientation film 207 is interposed between the orientation control projection 206 and the counter electrode 204. That is, a side surface of the outer periphery of the light shielding layer 205 is not covered with the orientation control projection 206, but is covered with the orientation film 207.

Further, in case of the VA-type liquid crystal display panel, the liquid crystal layer 3 which is sandwiched between the TFT substrate 1 and the counter substrate 2 has the liquid crystal molecules 301 thereof oriented perpendicular to the planar surface of the substrate when the voltage is in an OFF state, that is, when the potential difference between the pixel electrode and the counter electrode is 0, as shown in FIG. 5. Here, even when the voltage is in an OFF state, in the region where the orientation control projection 206 is formed, the liquid crystal molecules 301 are not oriented perpendicular to the planar surface of the substrate but are oriented in the direction approximately perpendicular to an inclined surface of the orientation control projection 206 (the orientation film 207).

Here, in the region where the liquid crystal molecules 301 are oriented in a tilting manner due to the influence of the orientation control projection 206, the retardation is generated in the liquid crystal layer 3. The retardation which is generated with the voltage in an OFF state, that is, at the time of performing a black display, generates leaking of light thus, as a result, lowering a transmissive contrast which is expressed with a value obtained by dividing permeability at the time of performing a white display with permeability at the time of performing a black display (white transmissivity/black transmissivity). To cope with such a situation, the light shielding layer 205 is formed in the region where the orientation control projection 206 is arranged and hence, leaking of light attributed to the retardation at the time of performing a black display is prevented thus preventing the lowering of the transmissive contrast.

However, when the size of the light shielding layer 205 is increased, while the leaking of light generated by retardation at the time of performing a black display may be prevented, transmissivity at the time of performing a white display is remarkably lowered. Accordingly, it is preferable to set the light shielding layer 205 to a size which can sufficiently prevent the leaking of light at the time of performing a black display and, at the same time, is as small as possible.

Next, a manufacturing method of the liquid crystal display panel of the embodiment 1 is explained. In manufacturing the liquid crystal display panel of the embodiment 1, first of all, the TFT substrate 1 and the counter substrate 2 are prepared. Here, the TFT substrate 1 is prepared using the same material and the same steps as the conventional TFT substrate and hence, the detailed explanation of the manufacture of the TFT substrate is omitted.

FIG. 6A to FIG. 6D are schematic cross-sectional views for explaining a method for preparing the counter substrate. Here, FIG. 6A to FIG. 6D are cross-sectional views showing four steps ranging from the step view 6A to the step view 6D which are important in the preparation of the counter substrate used in the liquid crystal display panel of the embodiment 1.

On the counter substrate 2 used in the liquid crystal display panel of the embodiment 1, first of all, the color filters 202 are formed on the surface of the glass substrate 201 using, for example, a photolithography method. To be more specific, for example, after applying or forming a photosensitive resist film for a red (R) color filter, patterning is performed to form the red color filter. Thereafter, the green color filter and the blue color filter are sequentially formed in the same manner.

Next, on the color filter 202, an overcoat layer 203 is formed and a surface of the overcoat filter 202 is smoothed.

Figure 6:
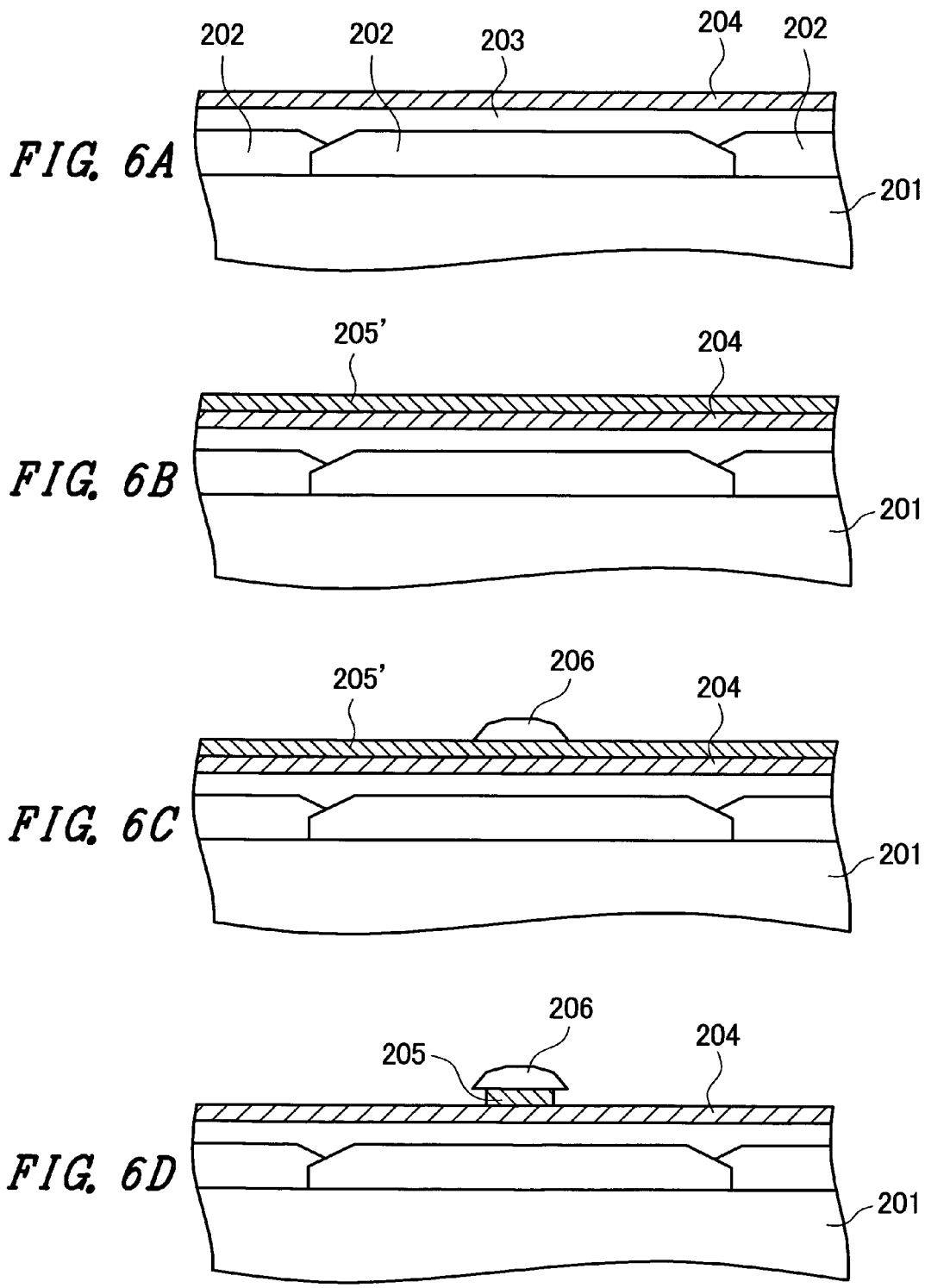
FIG. 6A to FIG. 6D are schematic cross-sectional views for explaining a manufacturing method of the counter substrate.

Then, as shown in FIG. 6A, the counter electrode (the common electrode) 204 is formed on the overcoat layer 203. The counter electrode 204 is, for example, formed as a p-ITO film having a thickness of 140 nm by sputtering.

Further, as shown in FIG. 6B, on the counter electrode 204, a conductive film 205' for forming the light shielding layer 205 is formed. The conductive film 205' is, for example, formed as an Mo film having a thickness of 50 nm by sputtering.

Next, as shown in FIG. 6C, the orientation control projection 206 is formed on the conductive film 205'. The orientation control projection 206 is, for example, formed such that a photosensitive resin is applied to the conductive film 205', the photosensitive resin is exposed using a photo mask having a desired pattern thereon and, thereafter, the above-mentioned photosensitive resin is partially removed using an alkaline developer. Here, the thickness (height) and the inclined angle of the orientation control projection 206 can be controlled based on a baking condition of the above-mentioned photosensitive resin. In the embodiment 1, the orientation control projection 206 with a straight pattern having a width of 15 µm, a thickness of 1.0 µm and an inclined portion of an angle of 20° is formed.

Next, as shown in FIG. 6D, the conductive film 205' is patterned using the previously formed orientation control projection 206 as a mask thus forming the light shielding layer 205. When the conductive film 205' is formed of a Mo film, the patterning of the conductive film 205' is performed by etching using a phosphoric acid solution. Here, a retraction quantity of the side surface of the outer periphery of the light shielding layer 205 from the outer periphery of the orientation control projection 206 can be controlled based on the etching conditions such as an etching temperature, an etching time, the composition of the etching solution and the like. In the embodiment 1, the patterning is performed by adjusting the etching conditions such that the retraction quantity of the side surface of the outer periphery of the light shielding layer 205 from the outer periphery of the orientation control projection 206 becomes 0.1 µm.

Thereafter, for example, using a resin plate having a desired pattern thereon as a mask, on the counter electrode 204 on which the light shielding layers 205 and the orientation control projections 206 are formed, the orientation film 207 for the VA-type liquid crystal display panel is printed and baked. The baking of the orientation film 207 is, for example, performed in an atmosphere where a temperature is 230° C. for 10 minutes.

In manufacturing the liquid crystal display panel using the TFT substrate 1 and the counter substrate 2 obtained in the above-mentioned manner, first of all, the liquid crystal material 3 is filled between the TFT substrate 1 and the counter substrate 2 in a vacuum. In filling the liquid crystal material 3 in a vacuum, a gap (a cell gap) between the TFT substrate 1 and the counter substrate 2 is set to 4.0 µm using the sealing member 4 and spacers (SOC), for example, and a negative liquid crystal having refractive index anisotropy Δn of 0.10 is filled between the TFT substrate 1 and the counter substrate 2 in a vacuum. Here, the liquid crystal molecules 301 are oriented perpendicular to the direction of the planar surface of the substrate due to an orientation restricting force of the orientation films 112, 207 for VA for a VA-type liquid crystal display panel. Here, in the region where the orientation control projection 206 is formed, for example, as shown in FIG. 5, the liquid crystal molecules 301 are oriented substantially perpendicular to the inclined surface of the orientation control projection 206 (orientation film 207).

Next, the upper phase difference plate 5B and the upper polarizer 6B are adhered to the counter substrate 2, while the lower phase difference plate 5A and the lower polarizer 6A are adhered to the TFT substrate 1. Here, an upper circular polarizer is constituted by combining the upper polarizer 6B and the upper phase difference plate 5B on the counter substrate 2 side, while a lower circular polarizer is constituted by combining the lower polarizer 6A and the lower phase difference plate 5A on the TFT substrate 1 side. The upper circular polarizer and the lower circular polarizer are arranged such that the upper circular polarizer, the liquid crystal layer and the lower circular polarizer are arranged in this order and a relationship of (an upper polarizer angle) ⊥ (a lower circular polarizer angle) is established.

To be more specific, the upper phase difference plate 5B is formed by laminating, for example, a Z-axis phase difference plate having retardation of Δn·d=110 nm (being tilted at an angle of 45 degrees with respect to a main surface of the substrate), a uniaxially stretched phase difference plate (λ/4 phase difference plate) having retardation of Δn·d=140 nm, and a uniaxially stretched phase difference plate (λ/2 phase difference plate) having retardation of Δn·d=270 nm in order from the glass substrate 201 side of the counter substrate 2. Here, the λ/4 phase difference plate is laminated such that a lagging phase axis angle assumes 175 degrees, and the λ/2 phase difference plate is laminated such that a lagging phase axis angle assumes 55 degrees. Further, the upper polarizer 6B is laminated such that a transmissive axis angle assumes 160 degrees.

Further, the lower phase difference plate 5A is formed by laminating, for example, a Z-axis phase difference plate having retardation of Δn·d=110 nm (being tilted at an angle of 45 degrees with respect to the main surface of the substrate), a uniaxially stretched phase difference plate (λ/4 phase difference plate) having retardation of Δn·d=140 nm, and a uniaxially stretched phase difference plate (λ/2 phase difference plate) having retardation of Δn·d=270 nm in order from the glass substrate 101 side of the TFT substrate 1. Here, the λ/4 phase difference plate is laminated such that a lagging phase axis angle assumes 85 degrees, and the λ/2 phase difference plate is laminated such that a lagging phase axis angle assumes 145 degrees. Further, the lower polarizer 6A is laminated such that a transmissive axis angle assumes 70 degrees.

Here, the lagging phase axes of the respective phase difference plates 5A and 5B and transmissive axes of the respective polarizers 6A, 6B are indicated by angles which are measured in the counterclockwise direction using a predetermined direction, for example, the horizontal direction of the screen as the reference.

Further, although the upper phase difference plate 5B and the lower phase difference plate 5A may not be provided with the Z-axis phase difference plate, the provision of the Z-axis phase difference plate is desirable to broaden a viewing angle.

Further, in manufacturing the transmissive liquid crystal display device using the liquid crystal display panel of the embodiment 1, such a liquid crystal display device may be assembled in the same steps as a conventional transmissive liquid crystal display device and hence, the detailed explanation of assembling steps is omitted.

Figure 7:
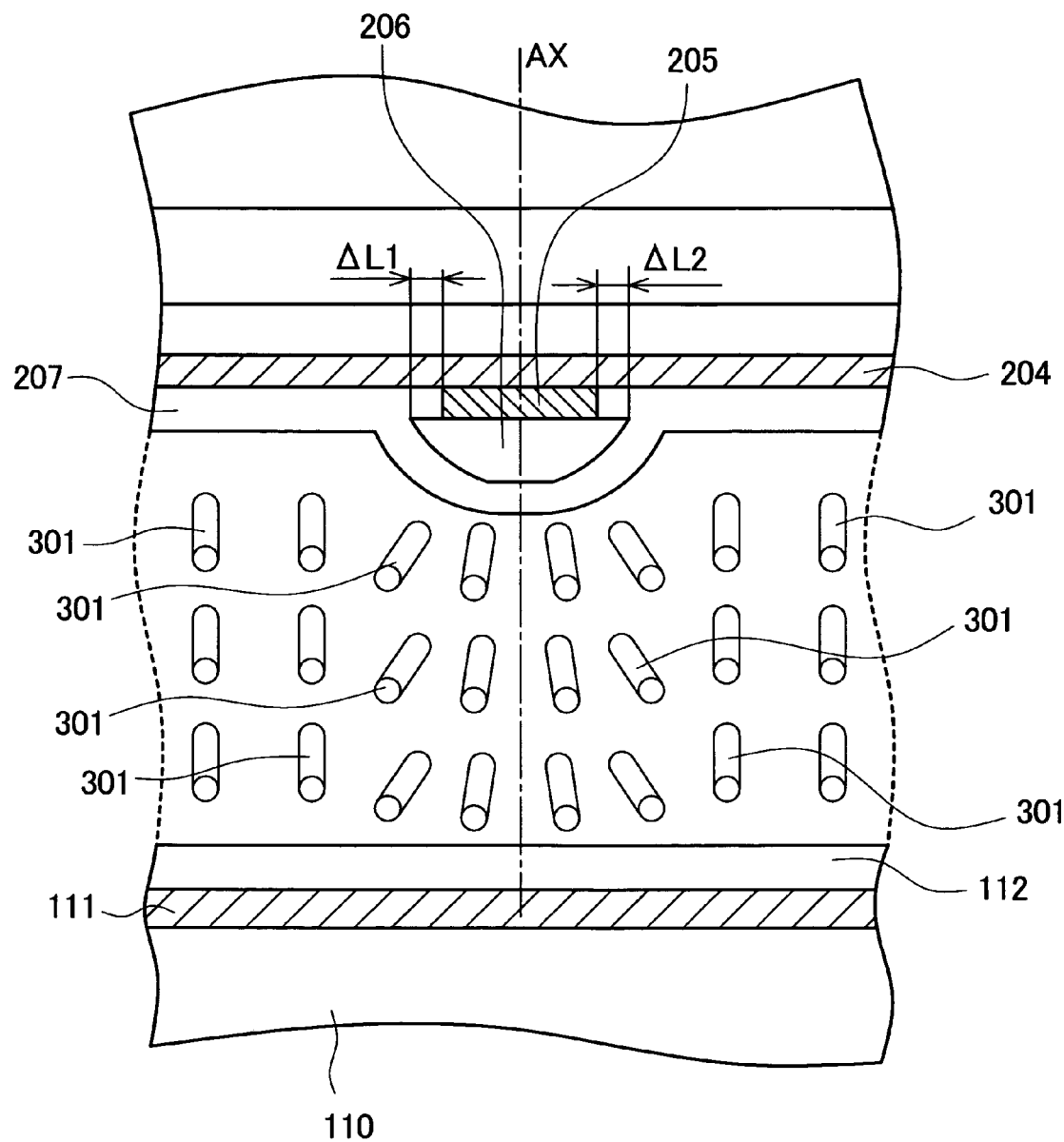
FIG. 7 is a schematic cross-sectional view for explaining the manner of operation and advantageous effects of the liquid crystal display panel of the embodiment 1.

FIG. 7 is a schematic cross-sectional view for explaining the manner of operation and advantageous effects of the liquid crystal display panel of the embodiment 1. Here, FIG. 7 is a view which shows a portion where the orientation control projection is formed in the cross-sectional view shown in FIG. 5 in an enlarged manner.

In the liquid crystal display panel of the embodiment 1, as mentioned previously, the orientation control projection 206 is patterned first of all, and a conductive film 205' is patterned using the orientation control projection 206 as a mask thus forming the light shielding layer 205. Accordingly, as viewed in a certain cross section, for example, as shown in FIG. 7, a retraction quantity ΔL1 of one end (outer periphery) of the light shielding layer 205 from one end (outer periphery) of the orientation control projection 206 is substantially equal to a retraction quantity ΔL2 of another end (outer periphery) of the light shielding layer 205 from another end (outer periphery) of the orientation control projection 206. Further, a retraction quantity of the whole region of the outer periphery of the light shielding layer 205 from the outer periphery of the orientation control projection 206 is substantially fixed.

Further, the orientation control projection 206 is, in general, formed into a substantially laterally symmetrical (linear symmetry) shape with respect to a center line AX as an axis of symmetry as shown in FIG. 7, wherein regions where the orientation of the liquid crystal molecules 301 is changed along inclined surfaces of the orientation control projection 206 also become substantially laterally symmetrical with respect to the center axis AX. Accordingly, as in the case of the liquid crystal display panel of the embodiment 1, when the retraction quantity of the whole region of the outer periphery of the light shielding layer 205 from the outer periphery of the orientation control projection 206 is substantially fixed, it is possible to make the size of the outer periphery of the light shielding layer 205 as small as possible. That is, the orientation of the liquid crystal molecules 301 is changed due to the inclined surface of the orientation control projection 206 and hence, the size of the outer periphery of the light shielding layer 205 can be set to a minimum size which can shield light which passes through the region which causes leaking of light. Further, the light shielding layer 205 is patterned using the orientation control projection 206 as a mask, there arises substantially no positional displacement between the orientation control projection 206 and the light shielding layer 205. Accordingly, when the VA-type transmissive color liquid crystal display device performs a black display, leaking of light can be reduced and, at the same time, lowering of the transmissive numerical aperture can be prevented.

That is, according to the liquid crystal display panel of the embodiment 1, it is possible to lower the black transmissivity by reducing the leaking of light at the time of performing the black display and, at the same time, it is possible to minimize lowering of white transmissivity by preventing lowering of the transmissive numerical aperture. As a result, it is possible to increase the transmissive contrast (white transmissivity/black transmissivity).

Embodiment 2

Figure 8:
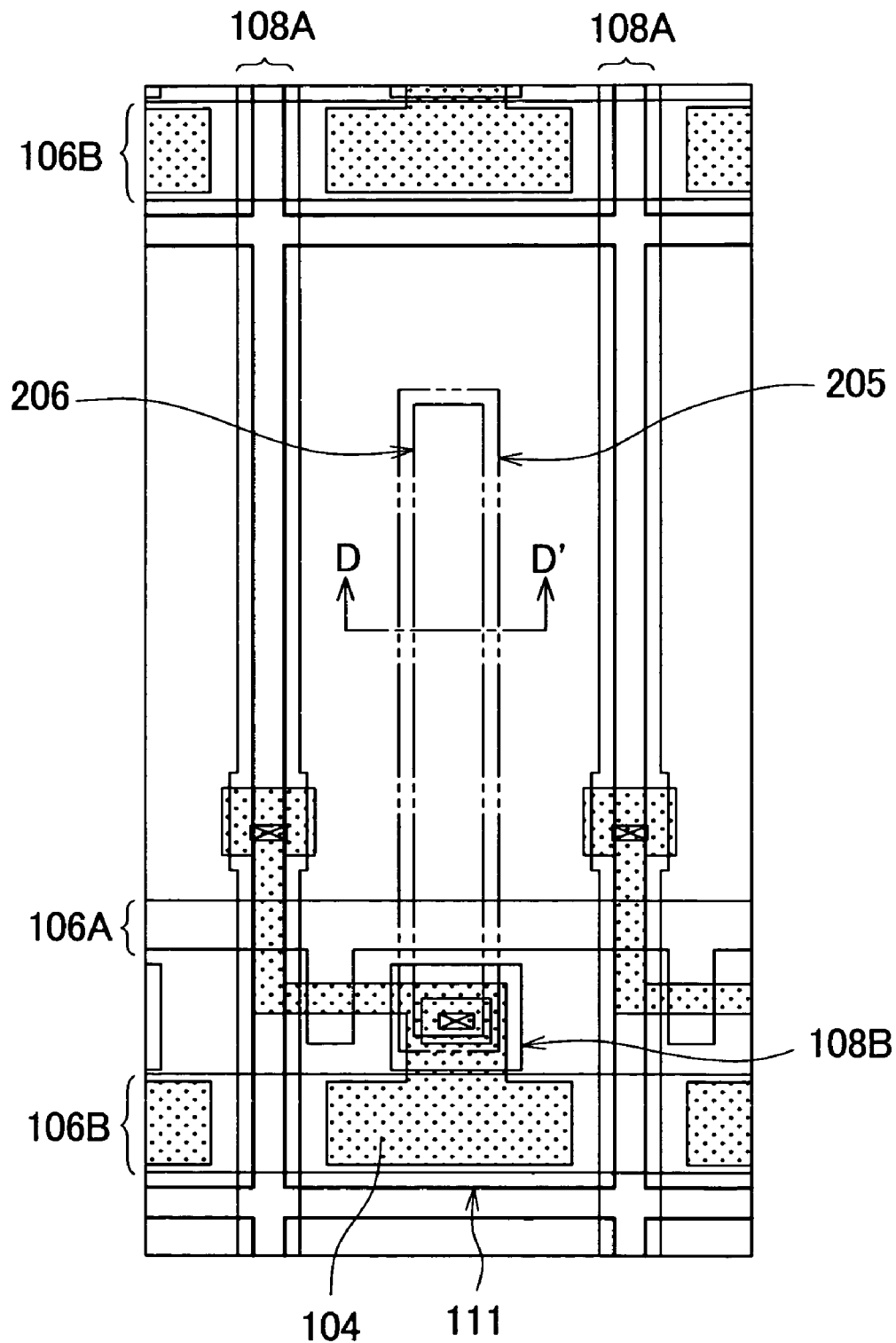
FIG. 8 is a plan view showing a constitutional example of one pixel of the liquid crystal display panel of an embodiment 2.
Figure 9:
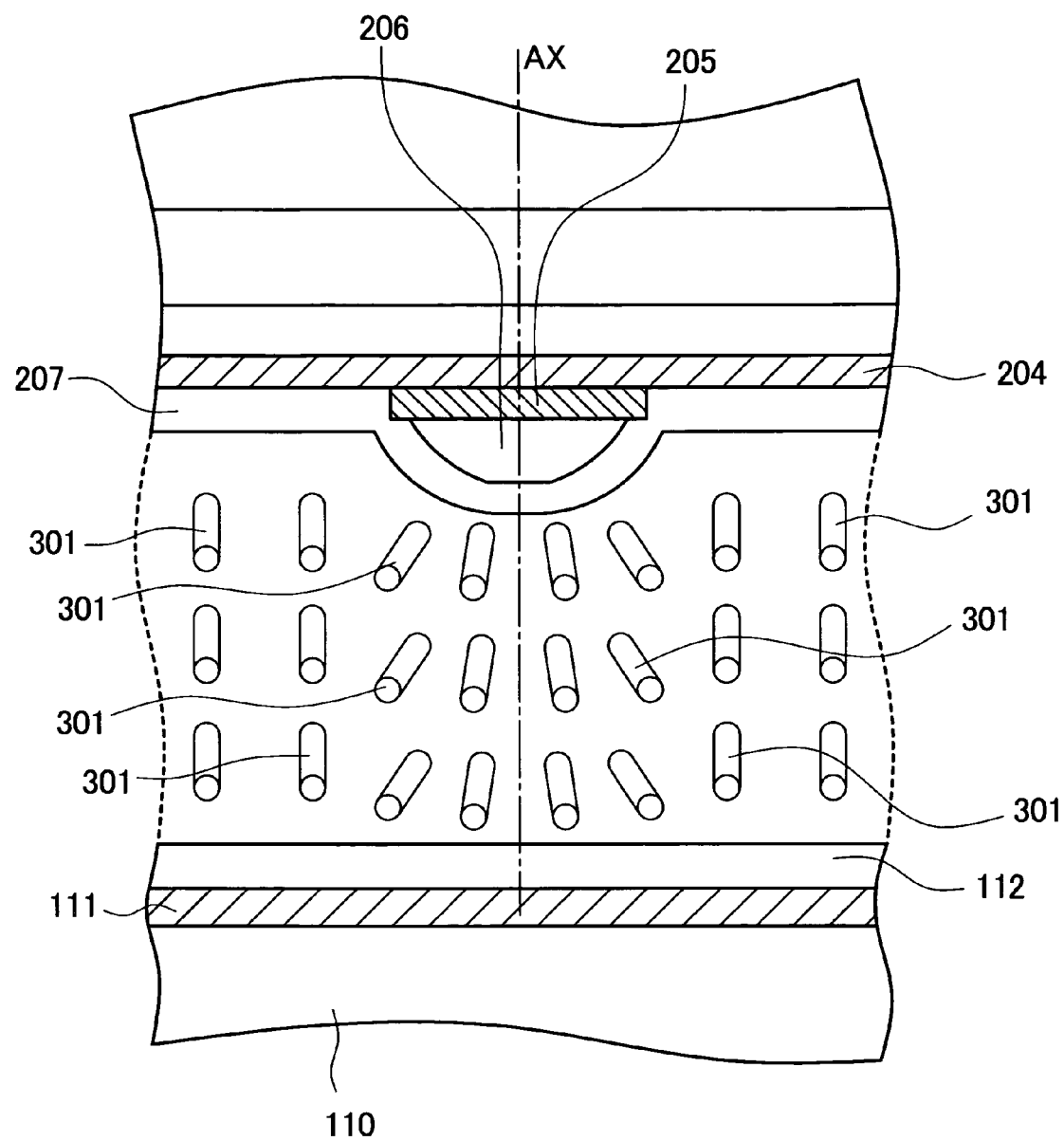
FIG. 9 is a cross-sectional view taken along a line D-D' in FIG. 8.

FIG. 8 and FIG. 9 are schematic views showing the schematic constitution of a liquid crystal display panel of an embodiment 2 of the present invention, wherein FIG. 8 is a plan view showing a constitutional example of one pixel of the liquid crystal display panel of the embodiment 2, and FIG. 9 is a cross-sectional view taken along a line D-D' in FIG. 8.

In the above-mentioned embodiment 1, the explanation has been made with respect to the liquid crystal display panel in which the outer periphery of the light shielding layer 205 is retracted to the inside from the outer periphery of the orientation control projection 206. However, the size of the outer periphery of the light shielding layer 205 is determined based on an inclination angle of the orientation control projection 206. Accordingly, the outer periphery of the light shielding layer 205 may be aligned with the outer periphery of the orientation control projection 206 or may be arranged outside the outer periphery of the orientation control projection 206. Accordingly, in the embodiment 2, as the variation of the above-mentioned embodiment 1, the explanation is made with respect to a constitutional example in which the outer periphery of the light shielding layer 205 is arranged outside the outer periphery of the orientation control projection 206 and one example of a manufacturing method of the liquid crystal display panel.

Here, the basic constitution of the liquid crystal display panel of the embodiment 2 is substantially equal to the basic constitution of the above-mentioned liquid crystal display panel of the embodiment 1 and hence, the detailed explanation is omitted.

Also in the liquid crystal display panel of the embodiment 2, the orientation control projection 206 and the light shielding layer 205 are, as shown in FIG. 8 and FIG. 9, formed on the counter substrate 2 and, at the same time, are arranged between the counter electrode 204 and the pixel electrode 111. However, in the liquid crystal display panel of the embodiment 2, the outer periphery of the light shielding layer 205 is arranged outside the outer periphery of the orientation control projection 206.

Figure 10A:
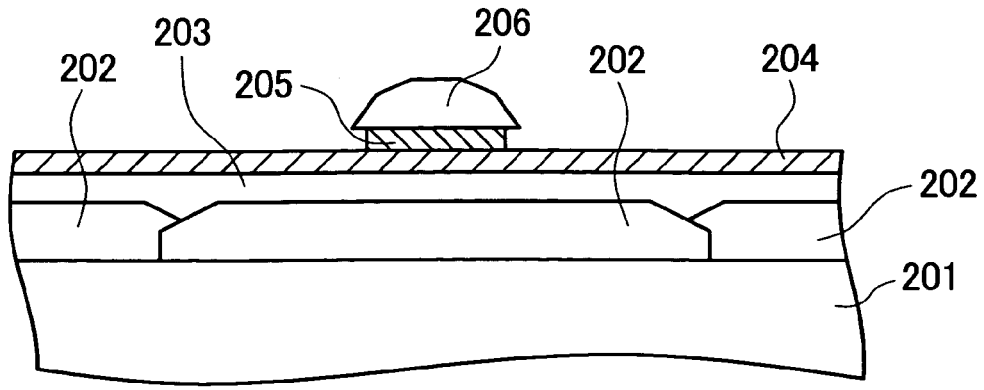
FIG. 10A and FIG. 10B are schematic views for explaining a manufacturing method of the liquid crystal display panel of the embodiment 2.
Figure 10B:
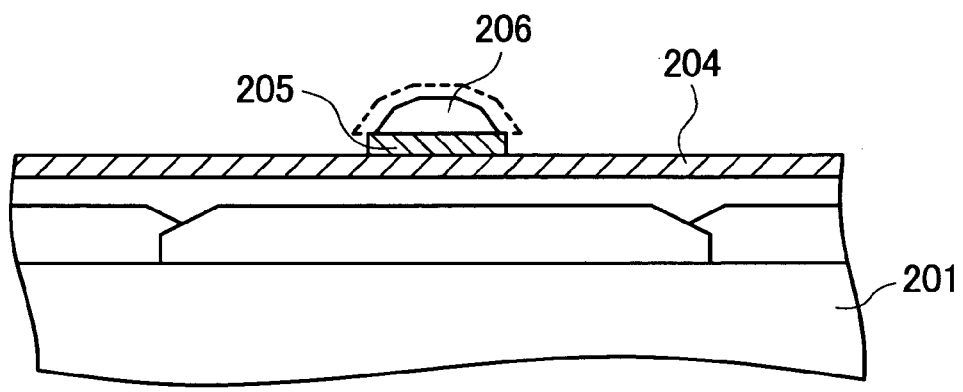

FIG. 10A and FIG. 10B are schematic views for explaining a manufacturing method of the liquid crystal display panel of the embodiment 2. Here, FIG. 10A and FIG. 10B are cross-sectional views showing two steps which are important in a method for preparing the counter substrate which is used in the liquid crystal display panel of the embodiment 2.

Also in the manufacture of the liquid crystal display panel of the embodiment 2, first of all, TFT substrate 1 and the counter substrate 2 are prepared. Here, TFT substrate 1 is prepared using the same material and the same steps as the conventional liquid crystal display panel and hence, the detailed explanation is omitted.

Further, in preparing the counter substrate 2, first of all, as explained in conjunction with the embodiment 1, the color filters 202, the overcoat layer 203 and the counter electrode (common electrode) 204 are formed on the glass substrate 201. Thereafter, in order of the steps shown in FIG. 6B to FIG. 6D, the orientation control projections 206 are patterned on the conductive film 205' and, thereafter, the conductive film 205' is patterned by etching using the orientation control projections 206 as masks thus forming the light shielding layers 205.

Here, when the orientation control projections 206 and the light shielding layers 205 are formed in this order, in general, as shown in FIG. 10A, the light shielding layer 205 assumes a state in which the outer periphery of the light shielding layer 205 is retracted to the inside from the outer periphery of the orientation control projection 206. Accordingly, as shown in FIG. 10B, after patterning the light shielding layer 205, a surface portion of the orientation control projection 206 is removed so as to arrange the outer periphery of the orientation control projection 206 inside the outer periphery of the light shielding layer 205. The removal of the surface portion is performed by O₂ ashing, for example. By performing the removal of the surface portion by O₂ ashing, an exposed surface of the orientation control projection 206 can be uniformly removed and hence, the whole region of the outer periphery of the light shielding layer 205 is spaced apart from the outer periphery of the orientation control projection 206 with a substantially fixed distance. Further, the light shielding layer 205 is patterned using the orientation control projection 206 as the mask and hence, substantially no positional displacement arises between the orientation control projection 206 and the light shielding layer 205. Accordingly, also in the liquid crystal display device of the embodiment 2, the orientation of the liquid crystal molecules 301 is changed due to the inclined surface of the orientation control projection 206 (the orientation film 207) and hence, the size of the outer periphery of the light shielding layer 205 can be set to a minimum size which can shield light which passes through the region which causes leaking of light. Accordingly, when the VA-type transmissive color liquid crystal display device performs a black display, leaking of light can be reduced and, at the same time, lowering of the transmissive numerical aperture can be prevented.

That is, also according to the liquid crystal display panel of the embodiment 2, it is possible to lower the black transmissivity by reducing the leaking of light at the time of performing the black display and, at the same time, it is possible to minimize lowering of white transmissivity by preventing lowering of the transmissive numerical aperture. As a result, it is possible to increase the transmissive contrast (white transmissivity/black transmissivity).

Figure 11:
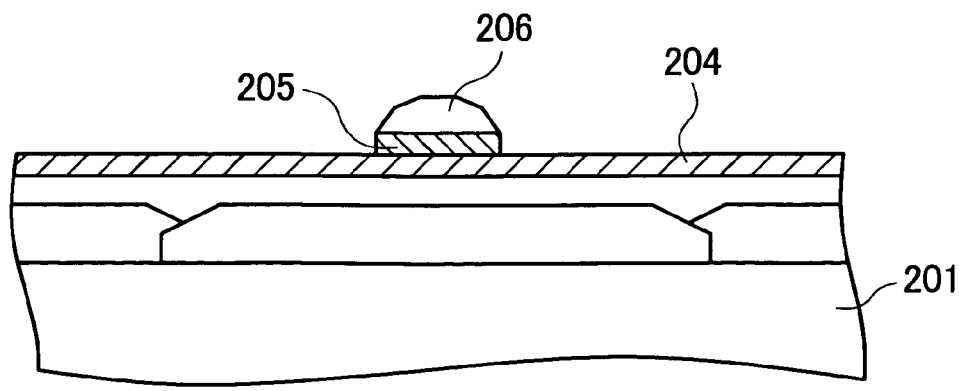
FIG. 11 is a schematic cross-sectional view for explaining a modification of the liquid crystal display panel of the embodiment 2.

FIG. 11 is a schematic cross-sectional view for explaining a modification of the liquid crystal display panel of the embodiment 2.

In the embodiment 2, for example, as shown in FIG. 8 and FIG. 9, the example in which the outer periphery of the light shielding layer 205 is arranged outside the outer periphery of the orientation control projection 206 is exemplified. However, it is needless to say that the present invention is not limited to such a case and the outer periphery of the light shielding layer 205 may be aligned with the outer periphery of the orientation control projection 206. In this case, conditions may be adjusted such that, for example, in applying O₂ ashing to the orientation control projection 206 after patterning the light shielding layer 205 using the orientation control projection 206 as the mask, as shown in FIG. 11, the ashing is finished at a point of time that the outer periphery of the orientation control projection 206 is aligned with the outer periphery of the light shielding layer 205.

Figure 12:
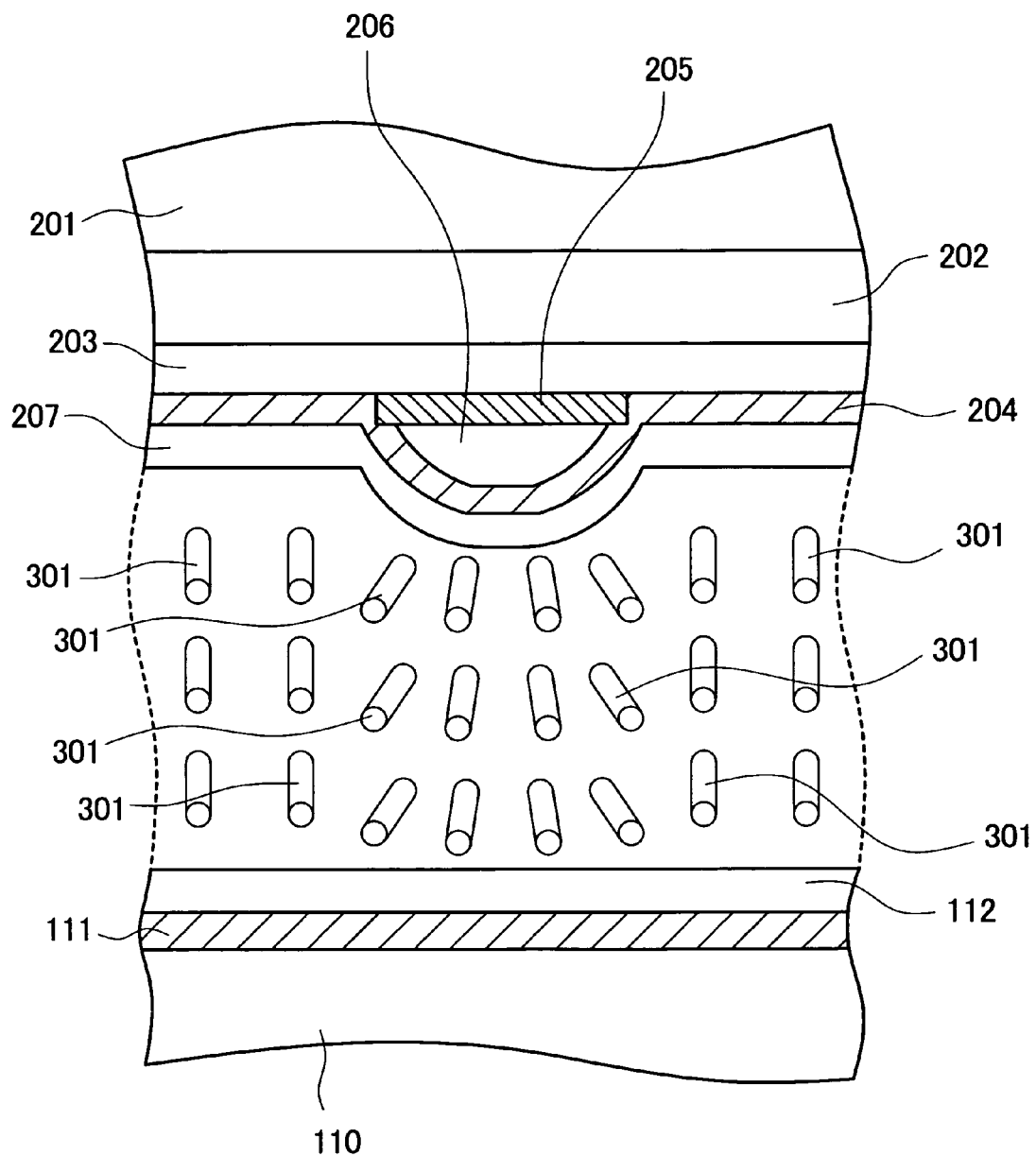
FIG. 12 is a schematic cross-sectional view for explaining a variation of the liquid crystal display panel of the embodiment 2.

FIG. 12 is a schematic cross-sectional view for explaining a variation of the liquid crystal display panel of the embodiment 2.

In the embodiment 2, the example in which the liquid crystal display panel forms the orientation control projection 206 and the light shielding layer 205 after forming the counter electrode 204 is exemplified. However, the present invention is not limited to such an example and the counter electrode 204 may be formed after forming the orientation control projection 206 and the light shielding layer 205. That is, for example, as shown in FIG. 12, the orientation control projection 206 and the light shielding layer 205 may be arranged between the overcoat layer 203 and the counter electrode 204.

In forming the counter substrate 2 having the constitution shown in FIG. 12, the overcoat layer 203 is formed and, thereafter, the formation of the conductive film 205', the patterning of the orientation control projection 206, the patterning of the light shielding layer 205 using the orientation control projection 206 as the mask, and the O₂ ashing of the orientation control projection 206 are performed. Thereafter, the counter electrode 204 is formed so as to cover the orientation control projection 206 and the light shielding layer 205.

Embodiment 3

Figure 13:
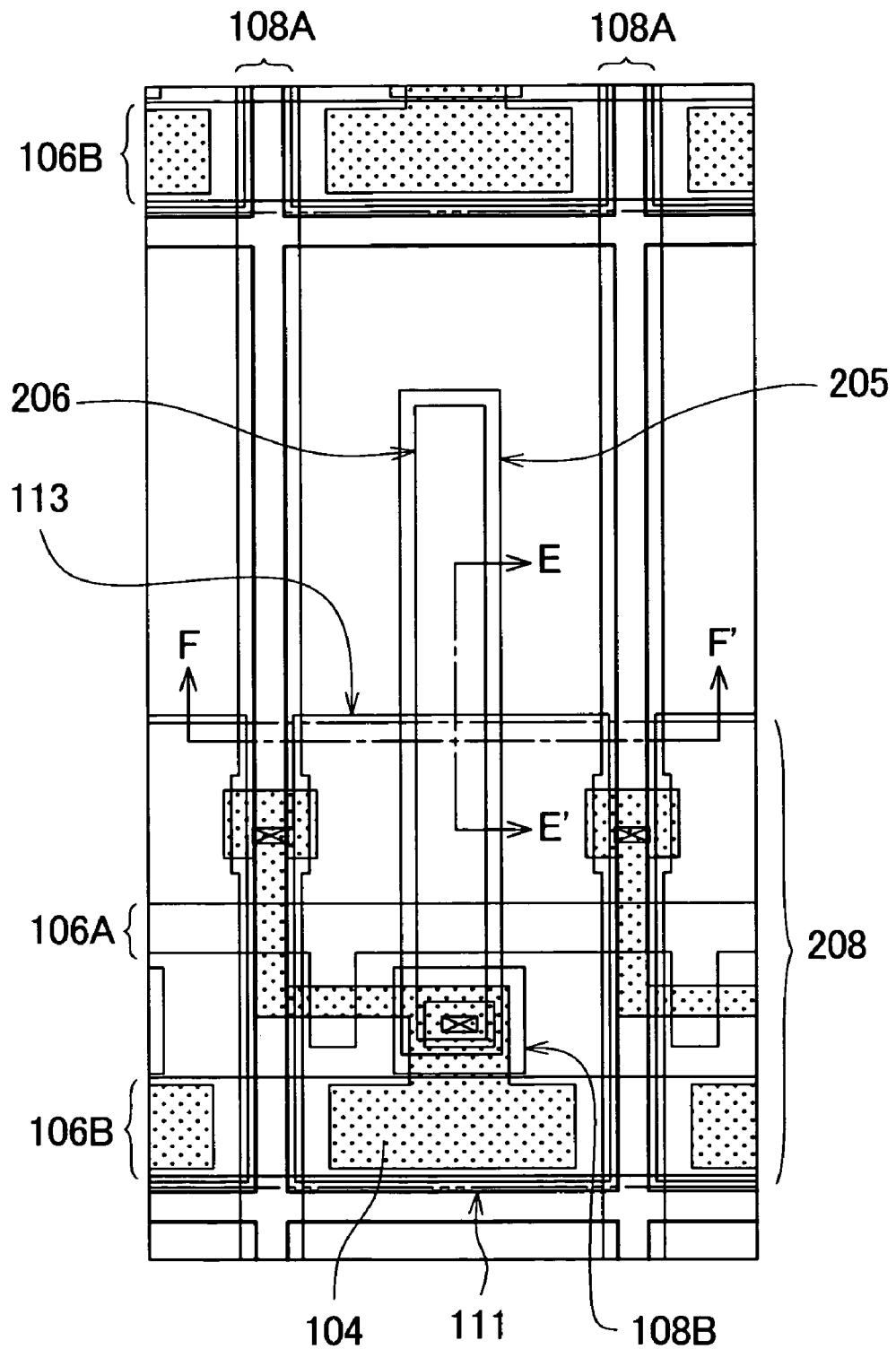
FIG. 13 is a plan view showing a constitutional example of one pixel of the liquid crystal display panel of an embodiment 3.
Figure 14:
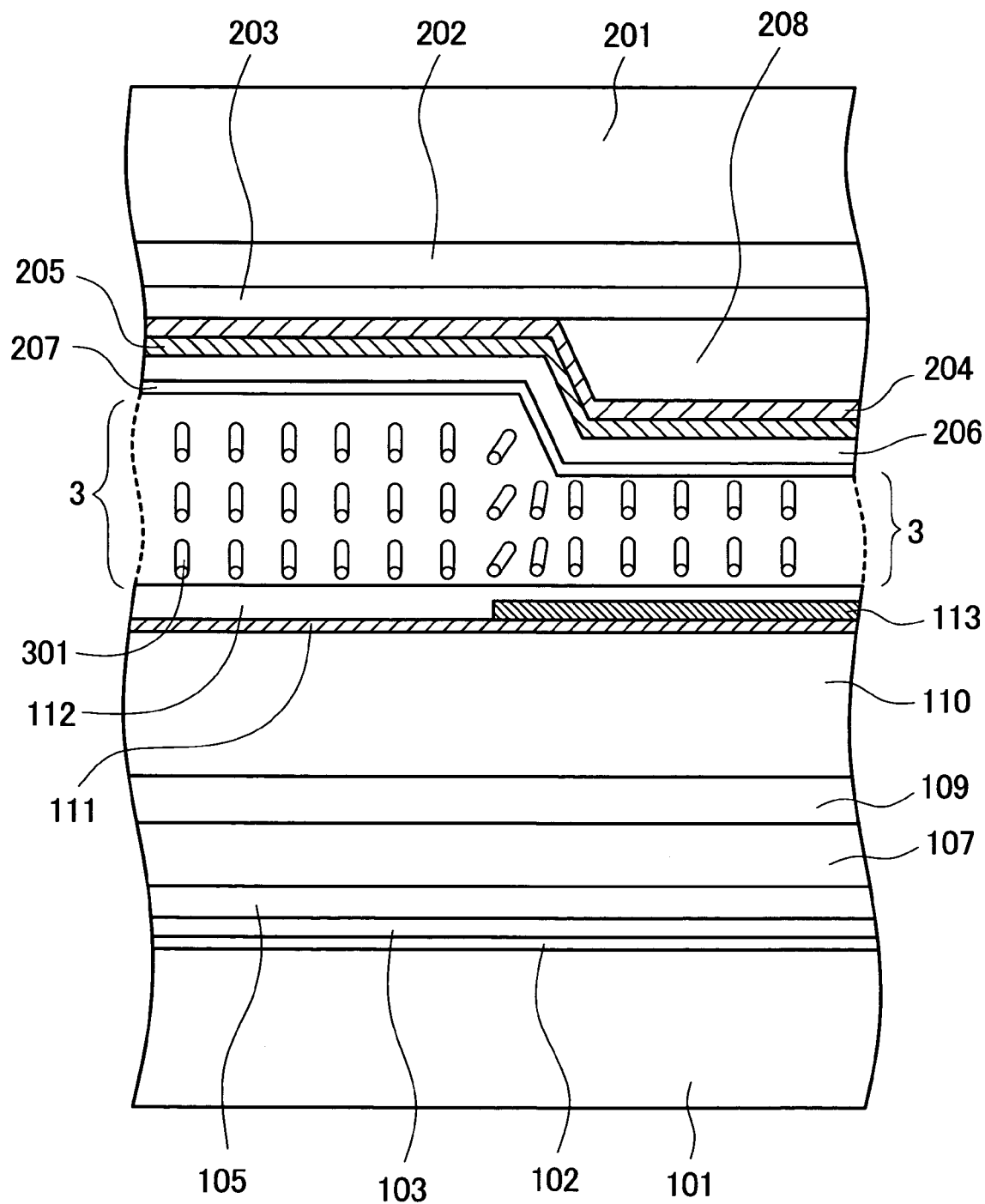
FIG. 14 is a cross-sectional view taken along a line E-E' in FIG. 13.
Figure 15:
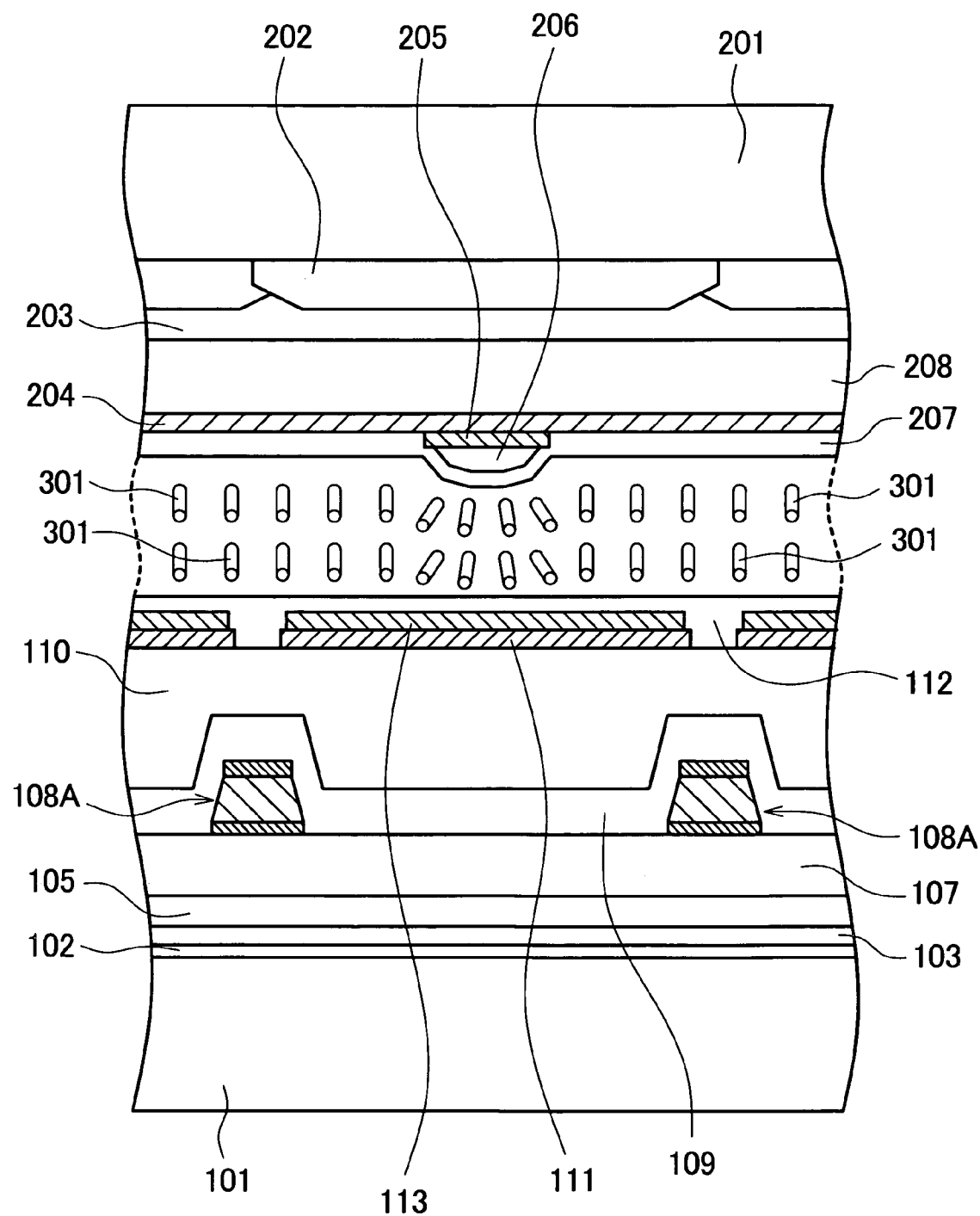
FIG. 15 is a cross-sectional view taken along a line F-F' in FIG. 13.

FIG. 13 to FIG. 15 are schematic views showing the schematic constitution of a liquid crystal display panel of an embodiment 3 according to the present invention, wherein FIG. 13 is a plan view showing a constitutional example of one pixel of the liquid crystal display panel of the embodiment 3, FIG. 14 is a cross-sectional view taken along a line E-E' in FIG. 13, and FIG. 15 is a cross-sectional view taken along a line F-F' in FIG. 13.

In the embodiment 1 and the embodiment 2, the example in which the liquid crystal display panel is constituted of a VA-type transmissive color liquid crystal display panel is exemplified. However, the present invention is not limited to such an example, and the present invention is also applicable to a semi-transmissive liquid crystal display panel. Accordingly, in the embodiment 3, the explanation is made with respect to a constitutional example of a VA-type semi-transmissive color liquid crystal display panel to which the present invention is applied.

Also in the liquid crystal display panel of the embodiment 3, the orientation control projection 206 and the light shielding layer 205 are, as shown in FIG. 13 and FIG. 15, formed on the counter substrate 2 and, at the same time, are arranged between the counter electrode 204 and the pixel electrode 111. Here, in the example shown in FIG. 13 and FIG. 15, the outer periphery of the light shielding layer 205 is arranged outside the outer periphery of the orientation control projection 206. However, the present invention is not limited to such an example.

Further, the liquid crystal display panel of the embodiment 3 is of a semi-transmissive, wherein one pixel (a subpixel) is constituted of two regions, that is, a transmissive display region which performs a display by allowing light from a backlight to pass therethrough and a reflective display region which performs a display by reflecting an external light. Here, the transmissive display region allows light to be incident on the liquid crystal layer 3 from a TFT substrate 1 side thereof and directly radiates light from a counter substrate 2 side thereof. On the other hand, in the reflective display region, light which is incident on the liquid crystal layer 3 from a counter substrate 2 side thereof is reflected on the TFT substrate 1, and light is radiated to the counter substrate 2 side through the liquid crystal layer 3 again. Accordingly, the semi-transmissive liquid crystal display panel is configured such that, for example, as shown in FIG. 14 and FIG. 15, a step forming layer 208 is formed on the reflective display region of the counter substrate 2 so as to make a thickness of the liquid crystal layer in the reflective display region smaller than a thickness of a liquid crystal layer in the transmissive display region. Here, it is preferable to set the thickness of the liquid crystal layer in the reflective display region approximately one half of the thickness of the liquid crystal layer in the transmissive display region. Due to such a constitution, for example, at the time of performing a white display, when the retardation of the liquid crystal layer in the reflective display region is 200 nm, the retardation of the liquid crystal layer in the transmissive display region becomes approximately 400 nm thus allowing the voltage-reflectance characteristic and voltage-transmissivity characteristic to be substantially equal to each other. Accordingly, it is possible to realize the reflection display and the transmission display which give no discomfort to a viewer within a range of the drive voltage.

Further, in the liquid crystal display panel of the embodiment 3, the basic constitution of the TFT substrate 1 is equal to the basic constitution of the TFT substrate 1 in the liquid crystal display panel of the above-mentioned embodiment 1 and hence, the detailed explanation is omitted. However, in case of the semi-transmissive liquid crystal display panel, for example, as shown in FIG. 13 to FIG. 15, a reflective layer 113 is provided to a region where the pixel electrode 111 is overlapped to the step forming layer 208 of the counter substrate 2.

Next, a manufacturing method of the liquid crystal display panel of the embodiment 3 is explained briefly. In manufacturing the liquid crystal display panel having the constitution shown in FIG. 13 to FIG. 15, the TFT substrate 1 may be prepared using the same material and the same steps as a conventional TFT substrate and hence, the detailed explanation is omitted. Here, the reflective layer 113 of the TFT substrate 1 is formed by continuously forming an Mo film having a thickness of approximately 50 nm and an Al film having a thickness of approximately 100 nm by spattering, for example, after forming the pixel electrode 111 and by patterning these Mo film and Al film. In patterning the Mo film and the Al film, for example, first of all, a photosensitive resist is applied to the Al film and, thereafter, the exposure is performed using a photo mask in which a desired pattern is drawn, and the photosensitive resist is partially removed with an alkaline developer. Then, using the remaining photosensitive resist as a mask, for example, the Al film and the Mo film are collectively etched using a phosphoric etchant. Then, after etching, for example, the photosensitive resist is removed using an organic alkaline liquid. After removing the photosensitive resin, a surface of the Al film is cleaned so as to form the orientation film 112.

Further, also in preparing the counter substrate 2, basically, the counter substrate 2 is prepared using the material and the steps explained in conjunction with the embodiment 2 and hence, the detailed explanation is omitted. Here, the step forming layer 208 is, for example, formed such that the overcoat layer 203 is formed and, thereafter, a photosensitive resin is applied to the overcoat layer 203, and the photosensitive resin is patterned. Patterning of the photosensitive resin is performed such that, for example, the photosensitive resin is exposed using a photo mask on which a desired pattern is drawn and, thereafter, the photosensitive resin is removed partially with an alkaline developer. Here, the photosensitive resin is baked by heating in an atmosphere where a temperature is 230 C° for 60 minutes, for example. After forming the step forming layer 208, in accordance with steps explained in conjunction with the embodiment 1 and the embodiment 2, the counter electrode 204, the orientation control projection 206, the light shielding layer 205 and the orientation film 207 are formed.

Also in such a VA-type reflective liquid crystal display panel, for example, when a black display is performed with a voltage in an OFF state, the orientation of the liquid crystal molecules 301 in the vicinity of the outer periphery of the orientation control projection 206 is not arranged perpendicular to the planar surface of the substrate and the retardation is generated. Accordingly, when the light shielding layer 205 is not provided, leaking of light is generated in performing the black display and hence, both of the reflective contrast (reflectance at the time of performing white display/reflectance at the time of performing black display) of the reflective display region and the transmissive contrast (transmissivity at the time of performing white display/transmissivity at the time of performing black display) of the transmissive display region are lowered. Further, also when the light shielding layer 205 is formed, in the conventional method for forming the light shielding layer 205 and the orientation control projection 206, the light shielding layer 205 becomes excessively large thus lowering the reflective numerical aperture and the transmissive numerical aperture whereby the reflectance and the transmissivity at the time of performing the white display are lowered.

On the other hand, as in the case of the embodiment 3, according to the liquid crystal display panel in which the orientation control projection 206 is patterned on the conductive film 205' and, thereafter, the light shielding layer 205 is formed by patterning the conductive film 205' by etching using the orientation control projection 206 as a mask, the positional displacement between the orientation control projection 206 and the light shielding layer 205 is hardly generated. Accordingly, the orientation of the liquid crystal molecules 301 is changed due to the inclined surface of the orientation control projection 206 (the orientation film 207) and hence, the size of the outer periphery of the light shielding layer 205 can be set to a minimum size which can shield light which passes through the region which causes leaking of light. Accordingly, when the VA-type transmissive color liquid crystal display device performs a black display, leaking of light can be reduced and, at the same time, lowering of the reflective numerical aperture and the transmissive numerical aperture can be prevented.

That is, also according to the semi-transmissive liquid crystal display panel of the embodiment 3, it is possible to lower the black reflectance and the black transmissivity by reducing the leaking of light at the time of performing the black display and, at the same time, it is possible to minimize lowering of the white reflectance and the white transmissivity by preventing the lowering of the reflective numerical aperture and the transmissive numerical aperture. As a result, it is possible to increase the reflective contrast (white reflectance/black reflectance) of the reflective display region and the transmissive contrast (white transmissivity/black transmissivity) of the transmissive display region.

Embodiment 4

Figure 16:
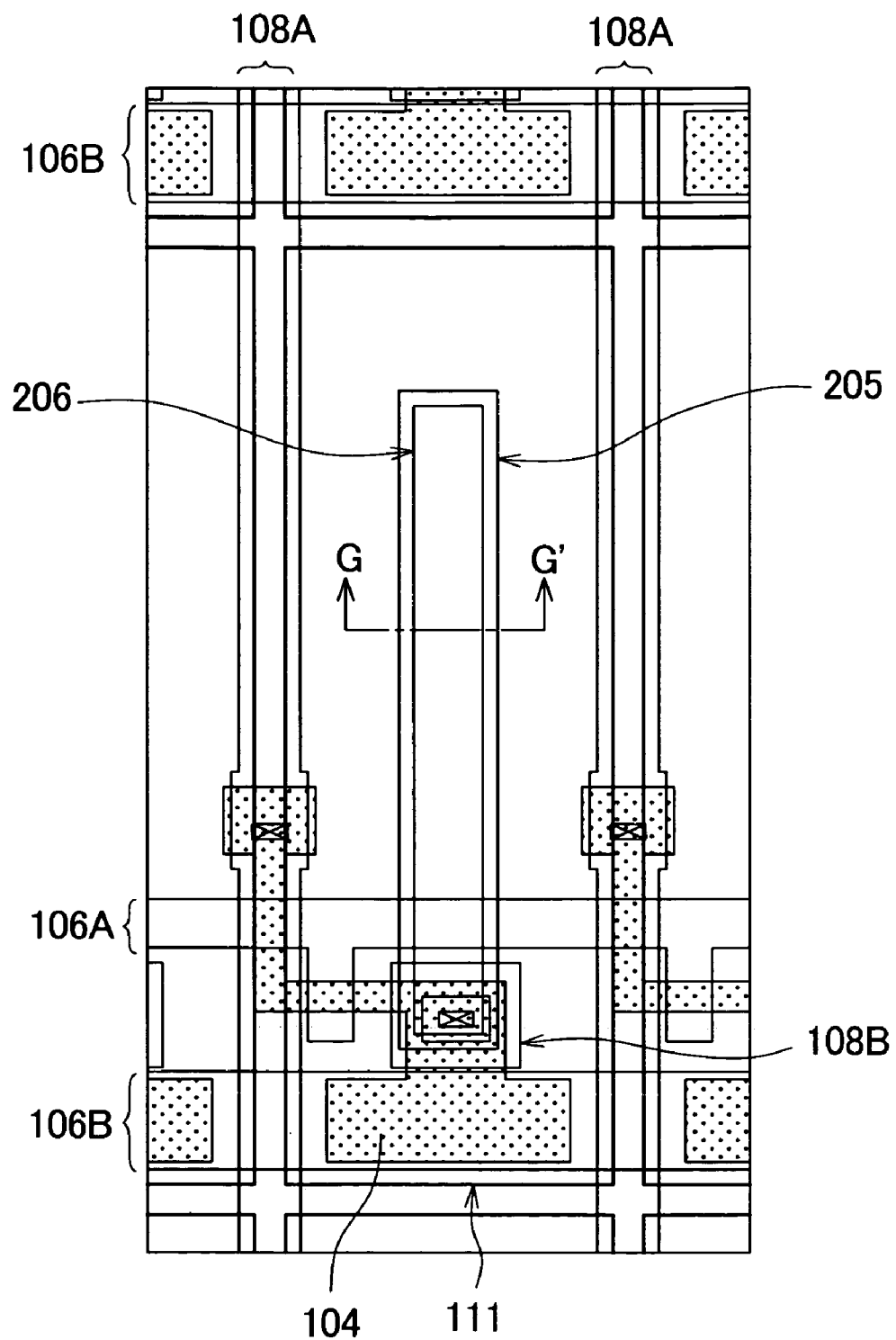
FIG. 16 is a plan view showing a constitutional example of one pixel of the liquid crystal display panel of an embodiment 4.
Figure 17:
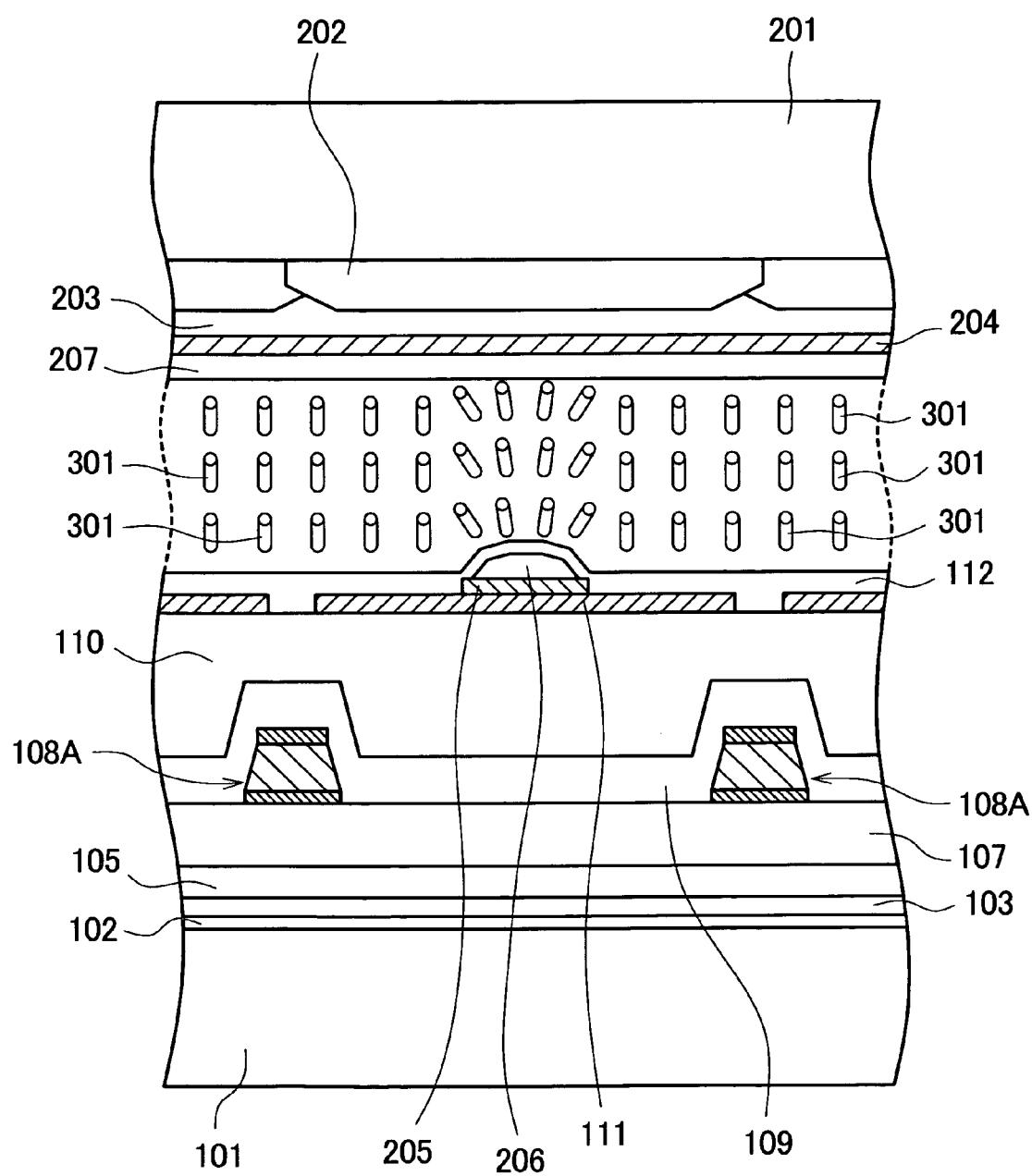
FIG. 17 is a cross-sectional view taken along a line G-G' in FIG. 16.

FIG. 16 and FIG. 17 are schematic views showing the schematic constitution of a liquid crystal display panel of an embodiment 4 according to the present invention, wherein FIG. 16 is a plan view showing a constitutional example of one pixel of the liquid crystal display panel of the embodiment 4, and FIG. 17 is a cross-sectional view taken along a line G-G' in FIG. 16.

In the embodiment 1 to embodiment 3, as one constitutional example of the VA-type liquid crystal display panel, the liquid crystal display panel which forms the orientation control projections 206 and the light shielding layers 205 on the counter substrate 2 is exemplified. However, the present invention is not limited to such a liquid crystal display panel and the orientation control projections 206 and the light shielding layers 205 may be formed on the TFT substrate 1. Accordingly, in the embodiment 4, a constitutional example of the liquid crystal display panel which forms the orientation control projections 206 and the light shielding layers 205 on the TFT substrate 1 is explained. Here, in the embodiment 4, a VA-type transmissive color liquid crystal display panel is exemplified.

In the VA-type transmissive color liquid crystal display panel, in forming the orientation control projections 206 and the light shielding layers 205 on the TFT substrate 1, for example, as shown in FIG. 16 and FIG. 17, the orientation control projection 206 and the light shielding layer 205 are arranged on the pixel electrode 111. Here, in the example shown in FIG. 16 and FIG. 17, the outer periphery of the light shielding layer 205 is arranged outside the outer periphery of the orientation control projection 206. However, the present invention is not limited to such a constitution, and the outer periphery of the light shielding layer 205 and the outer periphery of the orientation control projection 206 may be aligned with each other or the outer periphery of the light shielding layer 205 may be arranged inside the outer periphery of the orientation control projection 206.

Next, a manufacturing method of the liquid crystal display panel of the embodiment 4 is briefly explained. First of all, a preparing method of the TFT substrate 1 is explained. Here, since the preparation method of the TFT substrate 1 is performed using the same material and the same steps as a conventional TFT substrate until a step for forming pixel electrodes 111 on the glass substrate 101, the detailed explanation is omitted. In the manufacturing method of the liquid crystal display panel of the embodiment 4, in preparing the TFT substrate 1, after forming the pixel electrodes 111, for example, an Mo film having a thickness of approximately 50 nm and an Al film having a thickness of approximately 100 nm are continuously formed by spattering thus forming a conductive film for forming light shielding layers.

Next, for example, a photosensitive resin is applied to the conductive film for forming light shielding layers, and the orientation control projections 206 are formed by patterning the photosensitive resin. Patterning of the photosensitive resin is performed, for example, such that the photosensitive resin is exposed using a photo mask on which a desired pattern is drawn and, thereafter, the photosensitive resin is partially removed with an alkaline developer. Here, an inclination angle and a height of the orientation control projections 206 are controlled based on baking conditions of the photosensitive resin thus forming, for example, the orientation control projections 206 having a straight pattern in which the inclination angle is set to 20 degrees and a height (a thickness) is set to 1.0 µm, and a width is set to 15 µm.

Next, a conductive film (an Mo film and an Al film) for forming light shielding layers is patterned using the orientation control projections 206 as masks thus forming the light shielding layers 205. Patterning of the Mo film and the Al film, for example, is performed by collectively etching the Al film and the Mo film using a phosphoric etchant.

Further, as shown in FIG. 16 and FIG. 17, when the outer periphery of the light shielding layer 205 is arranged outside the outer periphery of the orientation control projection 206, after patterning the light shielding layer 205, surfaces (inclined surfaces) of the orientation control projection 206 may be uniformly retracted by $O_2$ ashing, for example.

After forming the orientation control projections 206 and the light shielding layers 205 in this manner, the orientation film 112 is formed.

On the other hand, in preparing the counter substrate 2, the counter substrate 2 may be prepared using the same material and the same steps as a method for preparing the counter substrate having neither the orientation control projections 206 nor the light shielding layers 205 and hence, the detailed explanation is omitted.

The transmissive liquid crystal display panel of the embodiment 4 is characterized by moving the orientation control projections 206 and the light shielding layers 205 formed on the counter substrate 2 of the transmissive liquid crystal display panel shown in FIG. 8 and FIG. 9 to the TFT substrate 1. That is, also in the transmissive liquid crystal display panel of the embodiment 4, in the same manner as the transmissive liquid crystal display panel of the embodiment 2, it is possible to lower the transmissivity at the time of performing the black display and, at the same time, it is possible to minimize lowering of the transmissivity at the time of performing the white display. As the result, the transmissive contrast (white transmissivity/black transmissivity) can be increased.

Embodiment 5

Figure 18:
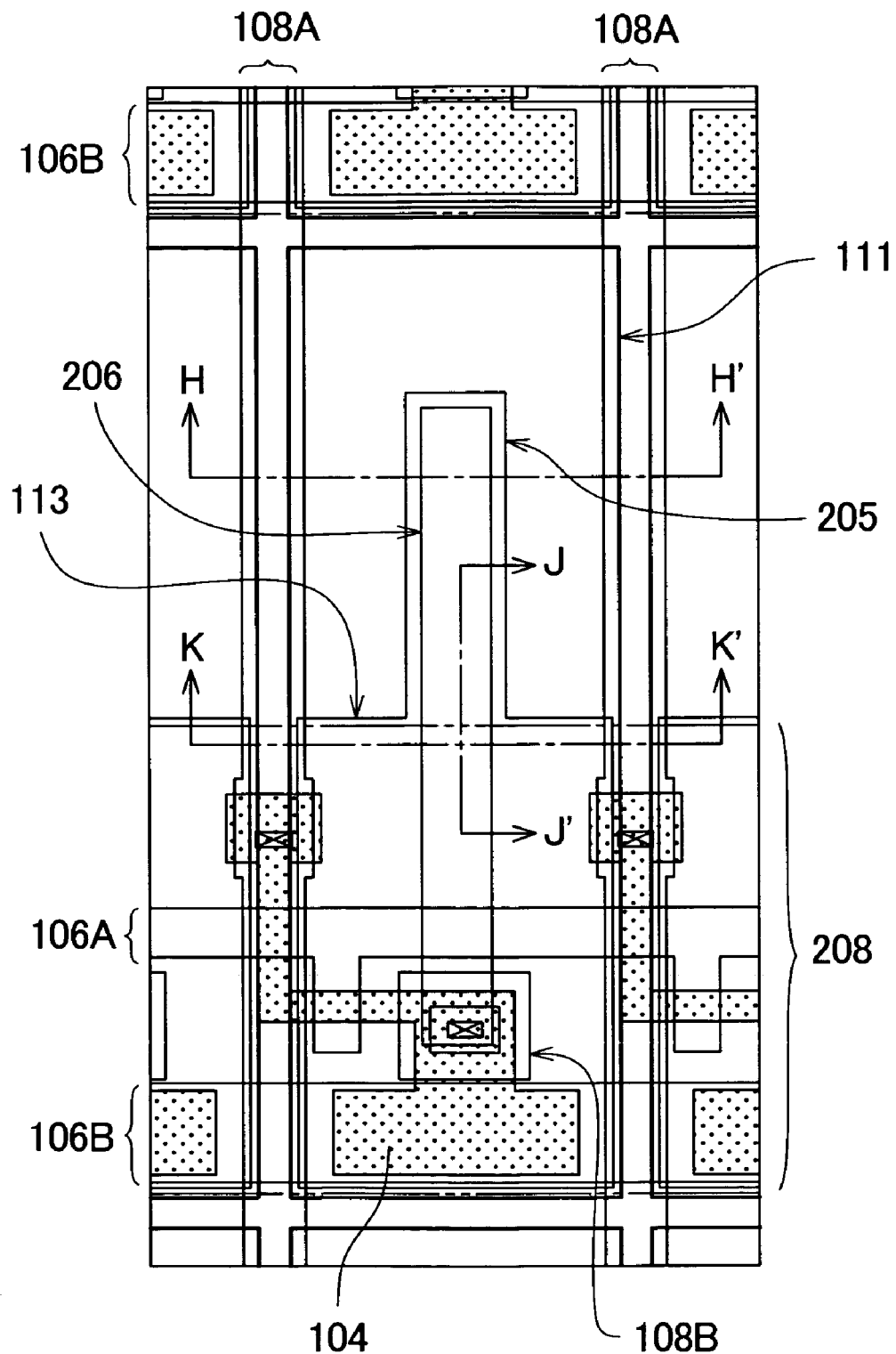
FIG. 18 is a plan view showing a constitutional example of one pixel of the liquid crystal display panel of an embodiment 5.
Figure 19:
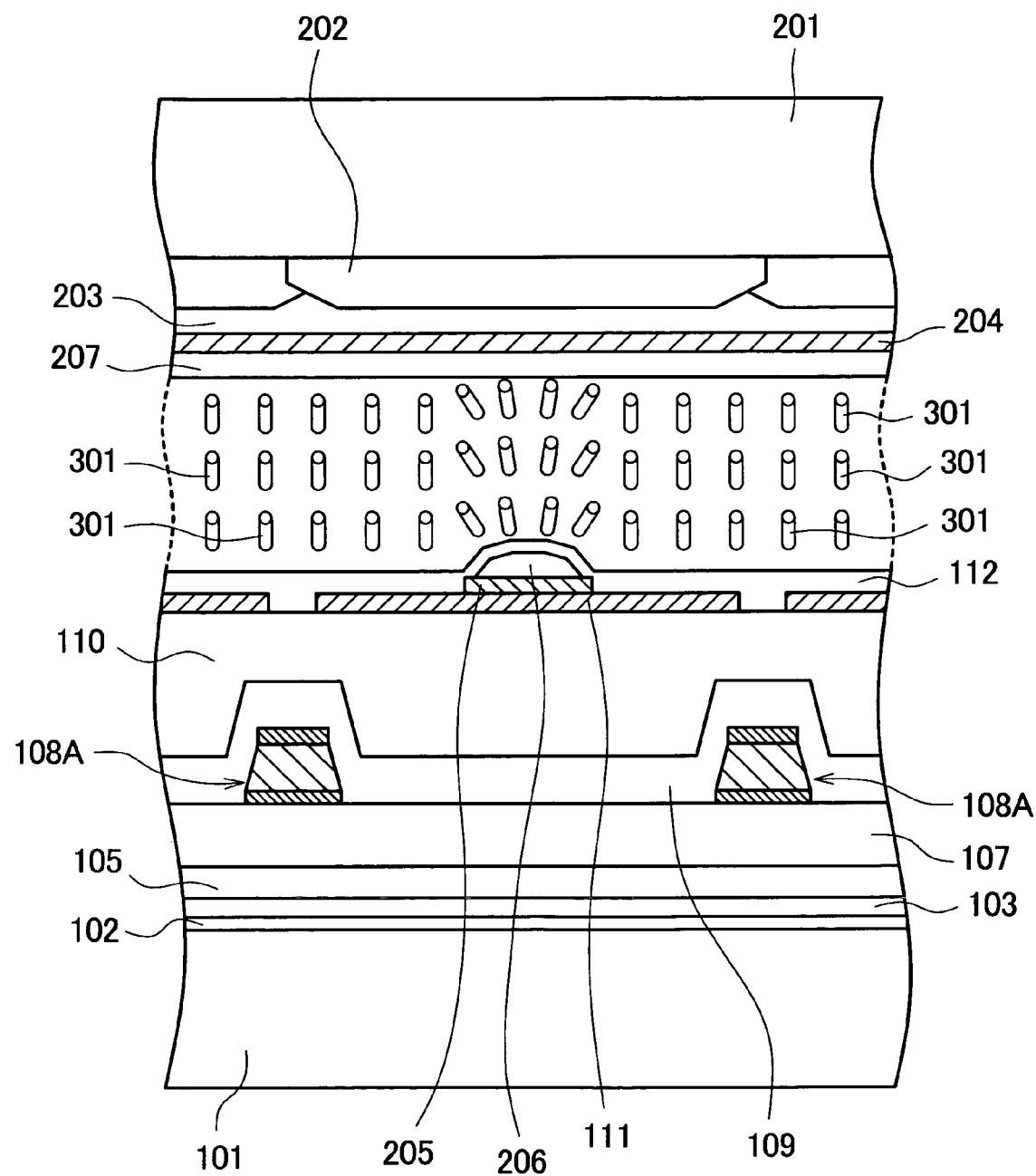
FIG. 19 is a cross-sectional view taken along a line H-H' in FIG. 18.
Figure 20:
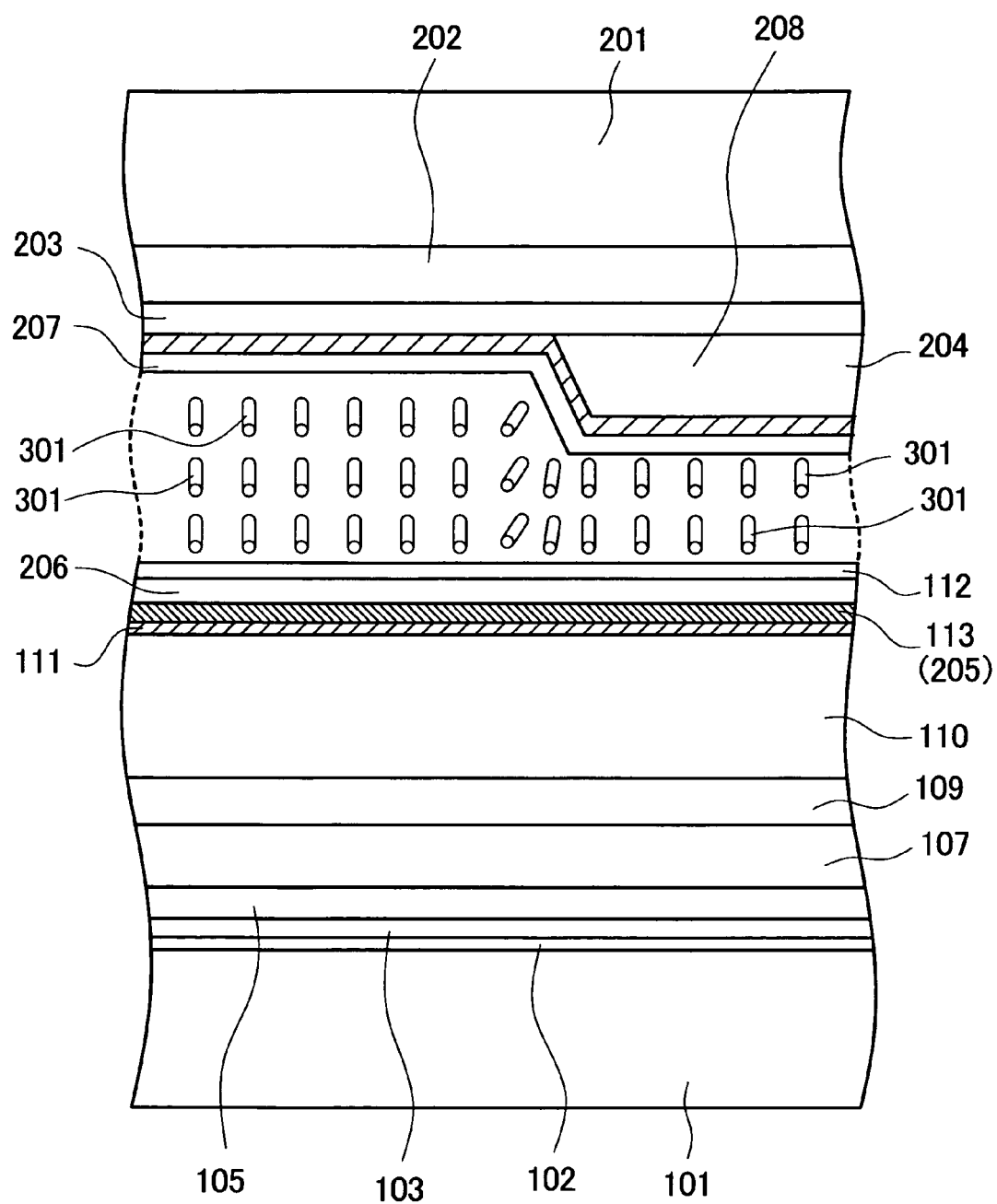
FIG. 20 is a cross-sectional view taken along a line J-J' in FIG. 18.
Figure 21:
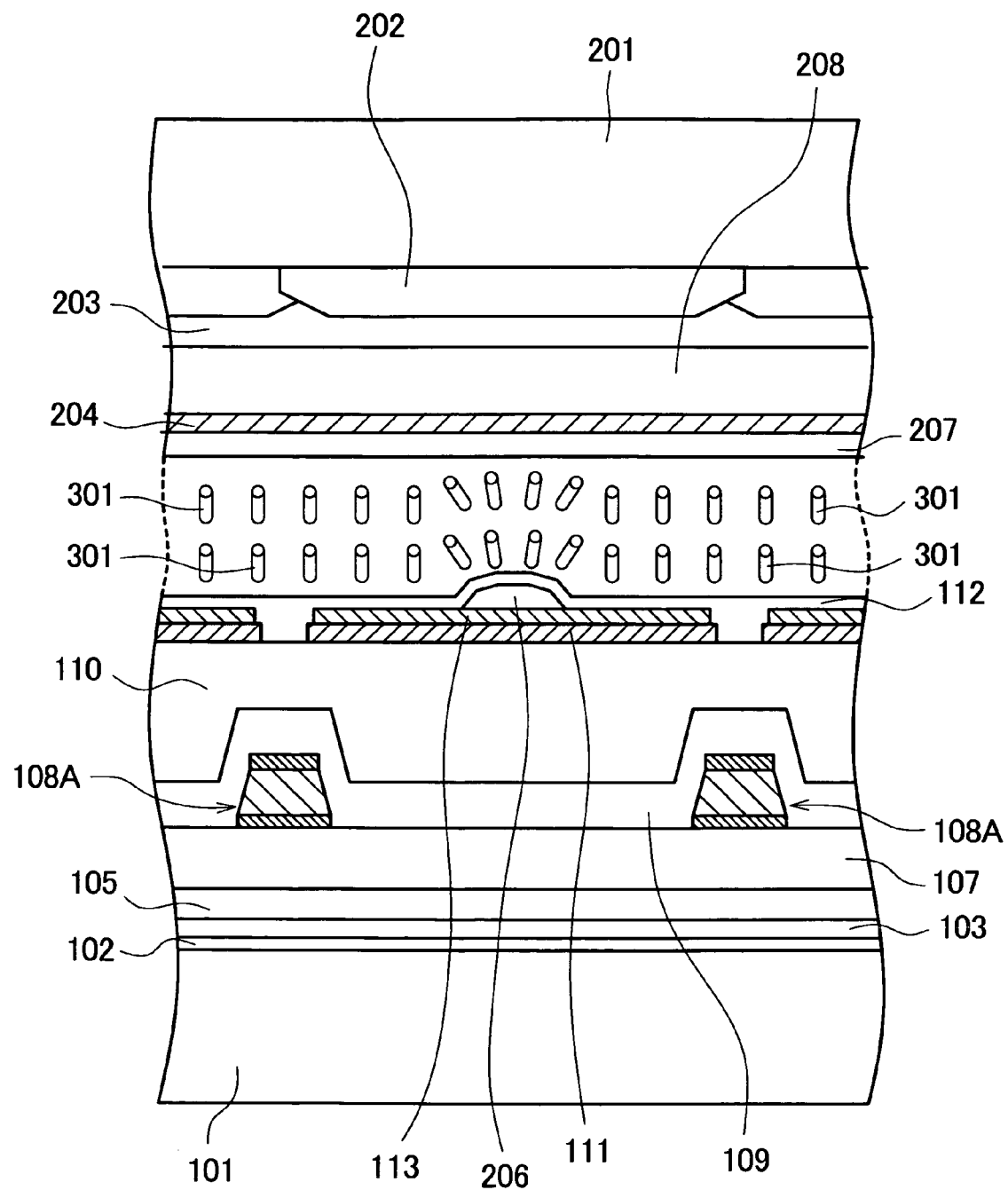
FIG. 21 is a cross-sectional view taken along a line K-K' in FIG. 18.

FIG. 18 to FIG. 21 are schematic views showing the schematic constitution of a liquid crystal display panel of an embodiment 5 according to the present invention, wherein FIG. 18 is a plan view showing a constitutional example of one pixel of the liquid crystal display panel of the embodiment 5, FIG. 19 is a cross-sectional view taken along a line H-H' in FIG. 18, FIG. 20 is a cross-sectional view taken along a line J-J' in FIG. 18, and FIG. 21 is a cross-sectional view taken along a line K-K' in FIG. 18.

In the embodiment 4, as the constitutional example of the liquid crystal display panel which forms the orientation control projections 206 and the light shielding layers 205 on the TFT substrate 1, the VA-type semi-transmissive liquid crystal display panel is exemplified. However, the present invention is not limited to such a transmissive color liquid crystal display panel and may be applicable to a semi-transmissive liquid crystal display panel. Accordingly, in this embodiment 5, the explanation is made with respect to a constitutional example of a semi-transmissive liquid crystal display panel which forms the orientation control projections 206 and the light shielding layers 205 on the TFT substrate 1. Here, in the embodiment 5, a VA-type semi-transmissive color liquid crystal display panel is exemplified.

In the liquid crystal display panel of the embodiment 5, the orientation control projection 206 and the light shielding layer 205 are, as shown in FIG. 18 to FIG. 21, arranged on the pixel electrode 111 of the TFT substrate 1. Here, in the example shown in FIG. 18 to FIG. 21, the outer periphery of the light shielding layer 205 is arranged outside the outer periphery of the orientation control projection 206. However, the present invention is not limited to such a constitution and the outer periphery of the light shielding layer 205 and the outer periphery of the orientation control projection 206 may be aligned with each other or the outer periphery of the light shielding layer 205 may be arranged inside of the outer periphery of the orientation control projection 206.

Further, the liquid crystal display panel of the embodiment 5 is of a semi-transmissive, wherein one pixel is constituted of two regions, that is, a transmissive display region in which one pixel performs a display by allowing light from a backlight to pass therethrough and a reflective display region which performs a display by reflecting an external light. Here, the transmissive display region allows light to be incident on the liquid crystal layer 3 from a TFT substrate 1 side thereof and directly radiates light from a counter substrate 2 side thereof. On the other hand, in the reflective display region, light which is incident on the liquid crystal layer 3 from the counter substrate 2 side thereof is reflected on the TFT substrate 1, and light is radiated from the counter substrate 2 side through the liquid crystal layer 3 again. Accordingly, the semi-transmissive liquid crystal display panel is configured such that, for example, as shown in FIG. 18 and FIG. 20, a step forming layer 208 is formed on the reflective display region of the counter substrate 2 so as to make a thickness of the liquid crystal layer in the reflective display region smaller than a thickness of a liquid crystal layer in the transmissive display region. Here, it is preferable to set the thickness of the liquid crystal layer in the reflective display region approximately one half of the thickness of the liquid crystal layer in the transmissive display region. Due to such a constitution, for example, it is possible to realize the reflection display and the transmission display which give no discomfort to a viewer within a range of the drive voltage.

Further, in the liquid crystal display panel of the embodiment 5, the basic constitution of the TFT substrate 1 is equal to the basic constitution of the TFT substrate 1 in the liquid crystal display panel of the above-mentioned embodiment 3 and hence, the detailed explanation is omitted. However, in case of the semi-transmissive liquid crystal display panel, for example, as shown in FIG. 19 to FIG. 21, a reflective layer 113 is provided to a region where the pixel electrode 111 is overlapped to the step forming layer 208 of the counter substrate 2. Here, it is desirable to collectively form the reflective layers 113 and the light shielding layers 205 using the same material.

Next, a manufacturing method of the liquid crystal display panel of the embodiment 5 is briefly explained. First of all, a preparing method of the TFT substrate 1 is explained. Here, since the preparation method of the TFT substrate 1 is performed using the same material and the same steps as a conventional TFT substrate until a step for forming pixel electrodes 111 on the glass substrate 101, the detailed explanation is omitted. In the manufacturing method of the liquid crystal display panel of the embodiment 5, in preparing the TFT substrate 1, after forming the pixel electrodes 111, for example, an Mo film having a thickness of approximately 50 nm and an Al film having a thickness of approximately 100 nm are continuously formed by spattering thus forming a conductive film for forming light shielding-reflective layers.

Next, for example, a photosensitive resin is applied to the conductive film for forming light shielding-reflective layers, and the orientation control projections 206 are formed by patterning the photosensitive resin. Patterning of the photosensitive resin is performed, for example, such that the photosensitive resin is exposed using a photo mask on which a desired pattern is drawn and, thereafter, the photosensitive resin is partially removed with an alkaline developer. Here, an inclination angle and a height of the orientation control projections 206 are controlled based on baking conditions of the photosensitive resin thus forming, for example, the orientation control projections 206 having a straight pattern in which the inclination angle is set to 20 degrees and a height (a thickness) is set to 1.0 μm, and a width is set to 15 μm.

Next, light shielding-reflective layers 113 (205) are formed by patterning the conductive film (an Mo film and an Al film) for forming light shielding-reflective layers. Patterning of the Mo film and the Al film is performed, for example, by applying photosensitive resin on the Al film on which the orientation control projections 206 are formed and, thereafter, exposure is made by using a photo mask on which a desired pattern is drawn, and the photosensitive resist is partially removed with an alkaline developer. Further, while using the remaining photo sensitive resist as a mask, for example, the Al film and the Mo film are collectively etched using a phosphoric etchant. Then, after etching, the photosensitive resist is removed using an organic alkaline liquid, for example.

Here, although the photosensitive resist is removed using the organic alkaline liquid, the orientation control projections 206 remain without being removed.

Further, as shown in FIG. 18 to FIG. 21, when the outer periphery of the light shielding layer 205 is arranged outside the outer periphery of the orientation control projection 206, after patterning the light shielding-reflective layer 113 (205), surfaces (inclined surfaces) of the orientation control projection 206 may be uniformly retracted by $O_2$ ashing, for example.

After forming the orientation control projections 206 and the light shielding-reflective layers 113 (205) in this manner, the orientation film is formed.

On the other hand, in preparing the counter substrate 2, the color filters 202 and the overcoat layer 203 are formed on the glass substrate 201 and, thereafter, the step forming layer 208 is formed in the method explained in conjunction with the embodiment 3. Further, after forming the step forming layer 208, the counter electrode 204 and the orientation film 207 are formed.

The semi-transmissive liquid crystal display panel of the embodiment 5 is characterized by moving the orientation control projections 206 and the light shielding layers 205 formed on the counter substrate 2 of the semi-transmissive liquid crystal display panel shown in FIG. 13 to FIG. 15 to the TFT substrate 1. That is, also in the semi-transmissive liquid crystal display panel of the embodiment 5, in the same manner as the semi-transmissive liquid crystal display panel of the embodiment 3, it is possible to lower the reflectance of the reflective display region and the transmissivity of the transmissive display region at the time of performing the black display and, at the same time, it is possible to minimize lowering of the reflectance of the reflective display region and the transmissivity of the transmissive display region at the time of performing the white display. As the result, the reflective contrast (white reflectance/black reflectance) of the reflective display region and the transmissive contrast (white transmissivity/black transmissivity) of the transmissive display region can be increased.

Embodiment 6

Figure 22:
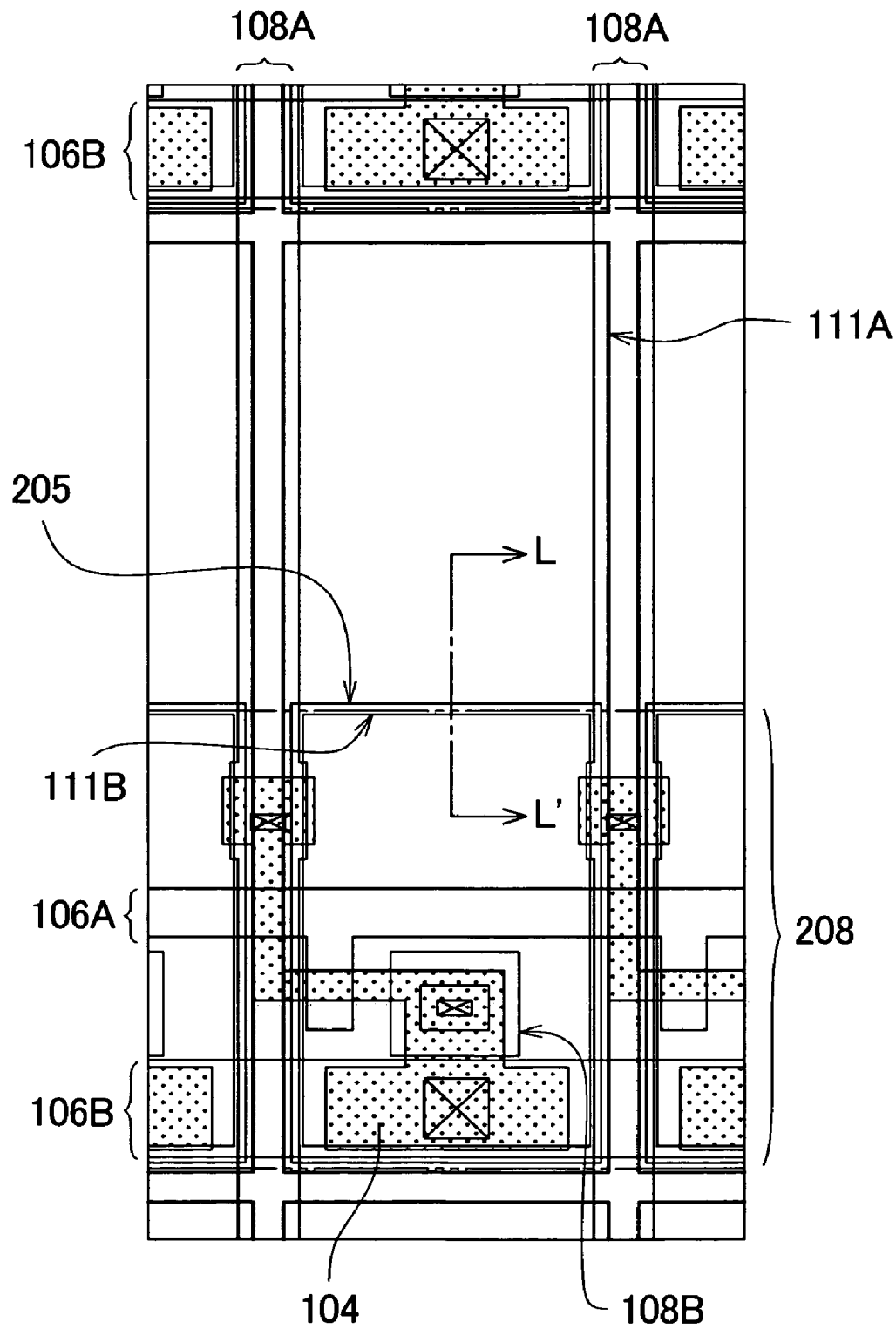
FIG. 22 is a plan view showing a constitutional example of one pixel of the liquid crystal display panel of an embodiment 6.
Figure 23:
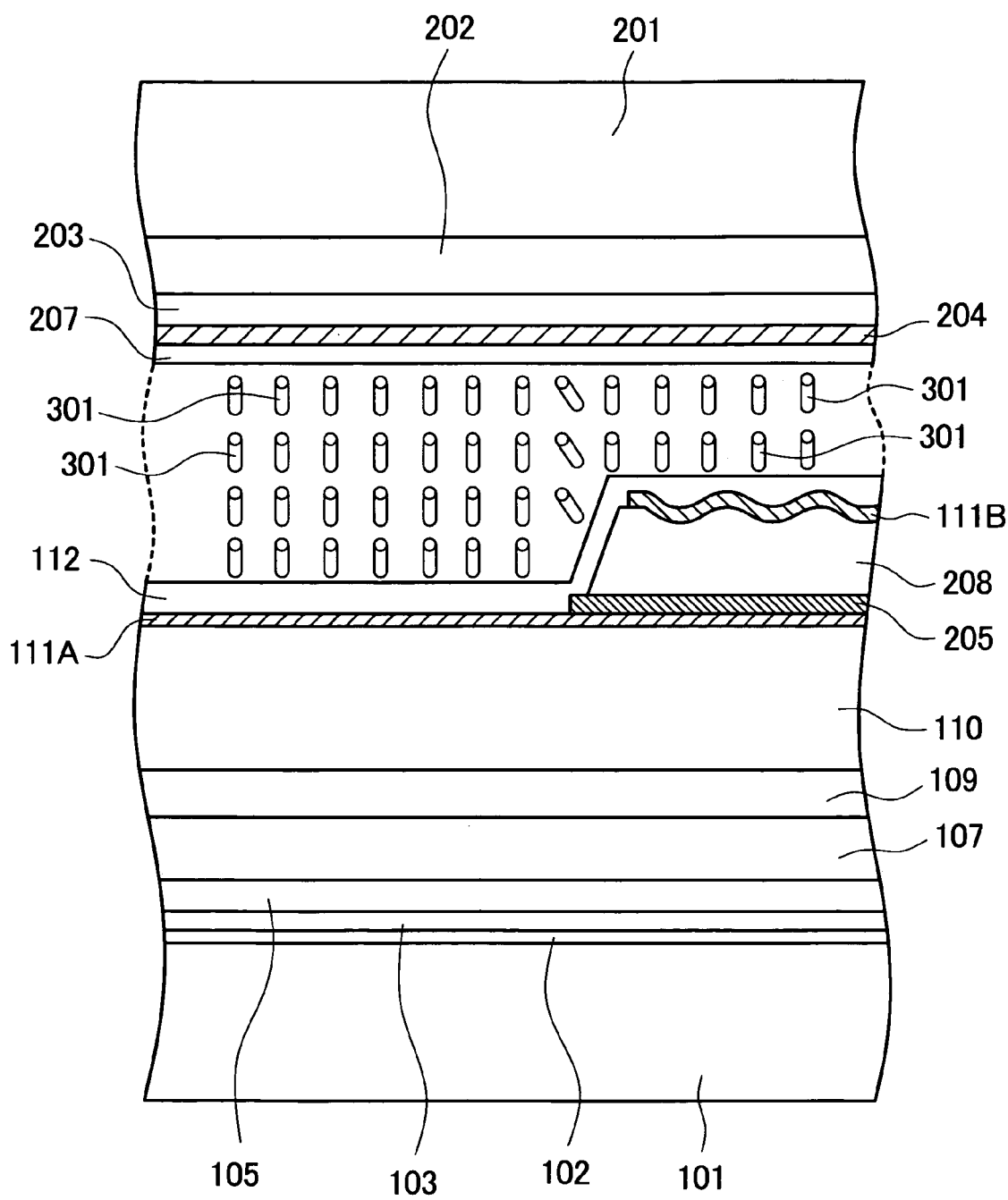
FIG. 23 is a cross-sectional view taken along a line L-L' in FIG. 22.

FIG. 22 and FIG. 23 are schematic views showing the schematic constitution of a liquid crystal display panel of an embodiment 6 according to the present invention, wherein FIG. 22 is a plan view showing a constitutional example of one pixel of the liquid crystal display panel of the embodiment 6, and FIG. 23 is a cross-sectional view taken along a line L-L' in FIG. 22.

In the embodiment 3 and the embodiment 5, the semi-transmissive liquid crystal display panel having the step forming layer 208 is exemplified. In such a semi-transmissive liquid crystal display panel having the step forming layer 208, the inclined surface is formed on an end portion of the step forming layer 208, and the orientation of the liquid crystal molecules 301 is tilted at such a portion and hence, leaking of light occurs. Accordingly, in the embodiment 6, the explanation is made with respect to a constitutional example of the liquid crystal display panel which can prevent leaking of light at the end portion of the step forming layer 208. Here, in the embodiment 6, the VA-type semi-transmissive color liquid crystal display panel is exemplified.

In the VA-type semi-transmissive color liquid crystal display panel, for example, as shown in FIG. 22 and FIG. 23, the step forming layer 208 may be formed on the TFT substrate 1. Here, on the step forming layer 208 of the reflective display region, as shown in FIG. 23, the pixel electrode 111B which also functions as a reflective layer is formed. Further, in case of the VA-type liquid crystal display panel, at the time of performing a black display with a voltage in an OFF state, the liquid crystal molecules 301 are arranged perpendicular to a planar surface of the substrate, in the vicinity of a side surface (inclined surface) of the step forming layer 208, the liquid crystal molecules 301 are oriented in the direction substantially perpendicular to the inclined surface. Accordingly, the retardation is generated in the liquid crystal layer in the vicinity of the inclined surface thus generating leaking of light at the time of performing the black display. Accordingly, in the liquid crystal display panel of the embodiment 6, as shown in FIG. 22 and FIG. 23, the light shielding layer 205 is formed between the pixel electrode (transparent electrode) 111A and the step forming layer 208 which extend over the reflective display region from the transmissive display region. Here, the light shielding layer 205 projects to the outside of the step forming layer 208, that is, to the transmissive display region side. Due to such a constitution, out of light from the backlight, it is possible to block light which is incident on the vicinity of the end portion (inclined surface) of the step forming layer 208 with the light shielding layer 205 thus reducing leaking of light at the time of performing the black display.

Next, a manufacturing method of the liquid crystal display panel of the embodiment 6 is briefly explained. First of all, a preparing method of the TFT substrate 1 is explained. Here, since the preparation method of the TFT substrate 1 is performed using the same material and the same steps as a conventional TFT substrate until a step for forming pixel electrodes (transparent electrodes) 111A on the glass substrate 101, the detailed explanation is omitted. In the manufacturing method of the liquid crystal display panel of the embodiment 6, in preparing the TFT substrate 1, after forming the pixel electrodes (transparent electrodes) 111A, for example, an Mo film having a thickness of approximately 50 nm and an Al film having a thickness of approximately 100 nm are continuously formed by sputtering thus forming a conductive film for forming light shielding layers.

Next, a photosensitive resin is applied to the conductive film for forming light shielding layers, and the step forming layer 208 is formed by patterning the photosensitive resin. Patterning of the photosensitive resin is performed, for example, such that the photosensitive resin is exposed using a photo mask on which a desired pattern is drawn and, thereafter, the photosensitive resin is partially removed with an alkaline developer. Here, the photosensitive resin is baked by heating in an atmosphere where a temperature is 230° C. for 60 minutes.

Next, a conductive film (an Mo film and an Al film) for forming light shielding layers is patterned using the step forming layers 208 as masks thus forming the light shielding layers 205. Patterning of the Mo film and the Al film is performed by collectively etching the Al film and the Mo film using a phosphoric etchant, for example.

After patterning the light shielding layer 205, surface (inclined surface) of the step forming layers 208 is uniformly retracted by $O_2$ ashing, for example.

After forming the light shielding layers 205 and the step forming layers 208 in this manner, the pixel electrodes (reflective electrodes) 111B and the orientation film 112 are formed on the step forming layers 208.

On the other hand, in preparing the counter substrate 2, the counter substrate 2 may be prepared using the same material and the same steps as a method for preparing the conventional counter substrate having neither the orientation control projections 206 nor the light shielding layers 205 and hence, the detailed explanation is omitted.

The liquid crystal display panel of the embodiment 6 has no orientation control projections 206 different from the liquid crystal display panels exemplified in the embodiment 1 to embodiment 5. However, the liquid crystal display panel of the embodiment 6 is provided with the step forming layers 208 and the inclined surface is formed on the end portion of the step forming layers 208. Accordingly, the end portion of the step forming layer 208 performs a function substantially equal to the function of the orientation control projection 206 thus giving rise to a drawback that leaking of light occurs at the time of performing the black display. Accordingly, by forming the light shielding layer 205 which uses the step forming layers 208 as a mask as in the case of the embodiment 6, leaking of light which occurs at the time of performing black display can be reduced. Further, although the transmissive numerical aperture of the transmissive display region may be decreased due to the provision of the light shielding layer 205, by forming the light shielding layer 205 by patterning which uses the step forming layers 208 as the mask, it is possible to make the light shielding layer 205 as small as possible. Accordingly, lowering of the transmissive numerical aperture of the transmissive display region can be suppressed to a minimum level.

That is, in the semi-transmissive liquid crystal display panel of the embodiment 6, it is possible to reduce leaking of light at the time of performing the black display and, at the same time, it is possible to minimize lowering of the transmissivity at the time of performing the white display in the transmissive display region. As a result, it is possible to increase the transmissive contrast (white transmissivity/black transmissivity) of the transmissive display region.

Embodiment 7

Figure 24:
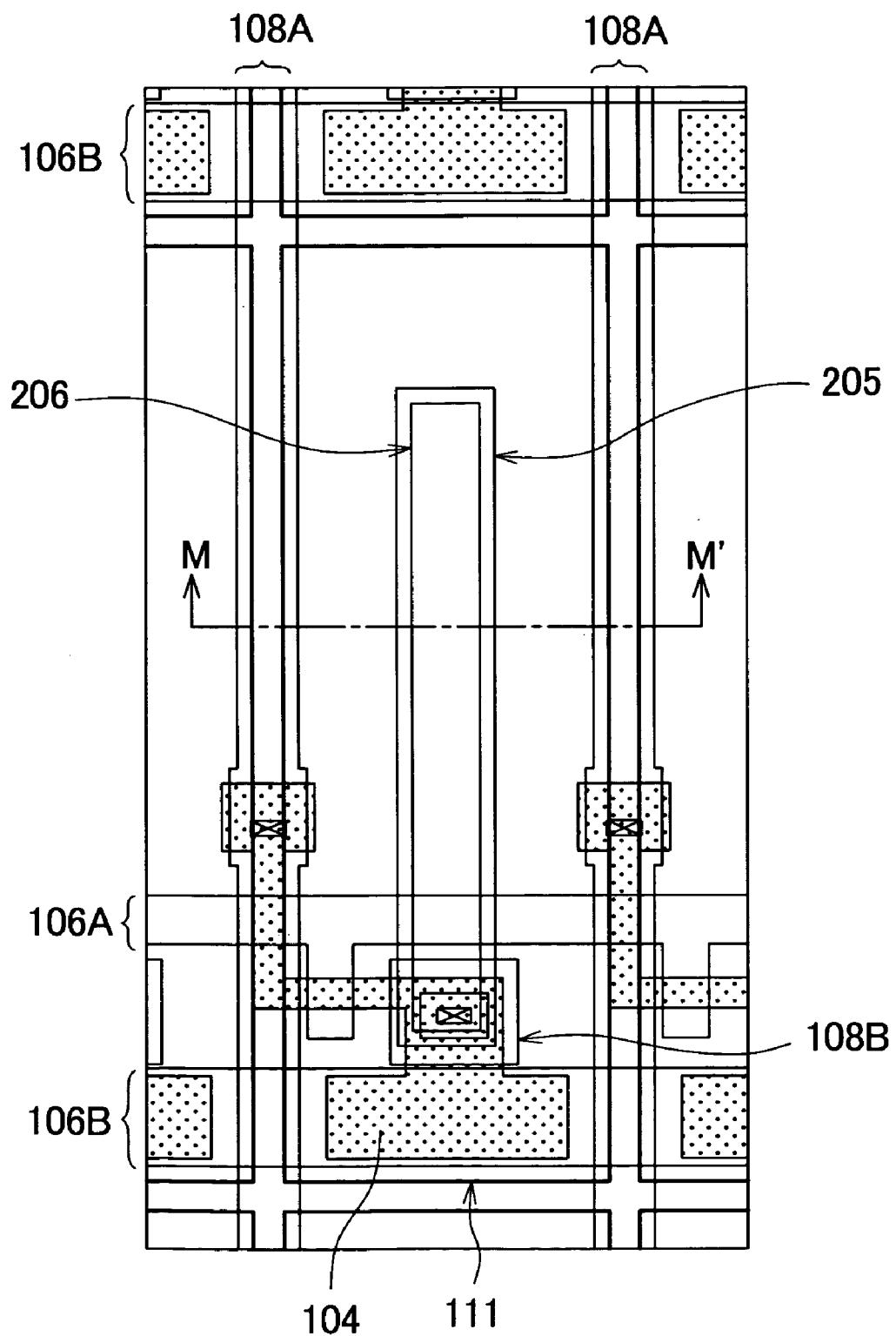
FIG. 24 is a plan view showing a constitutional example of one pixel of the liquid crystal display panel of an embodiment 7.
Figure 25:
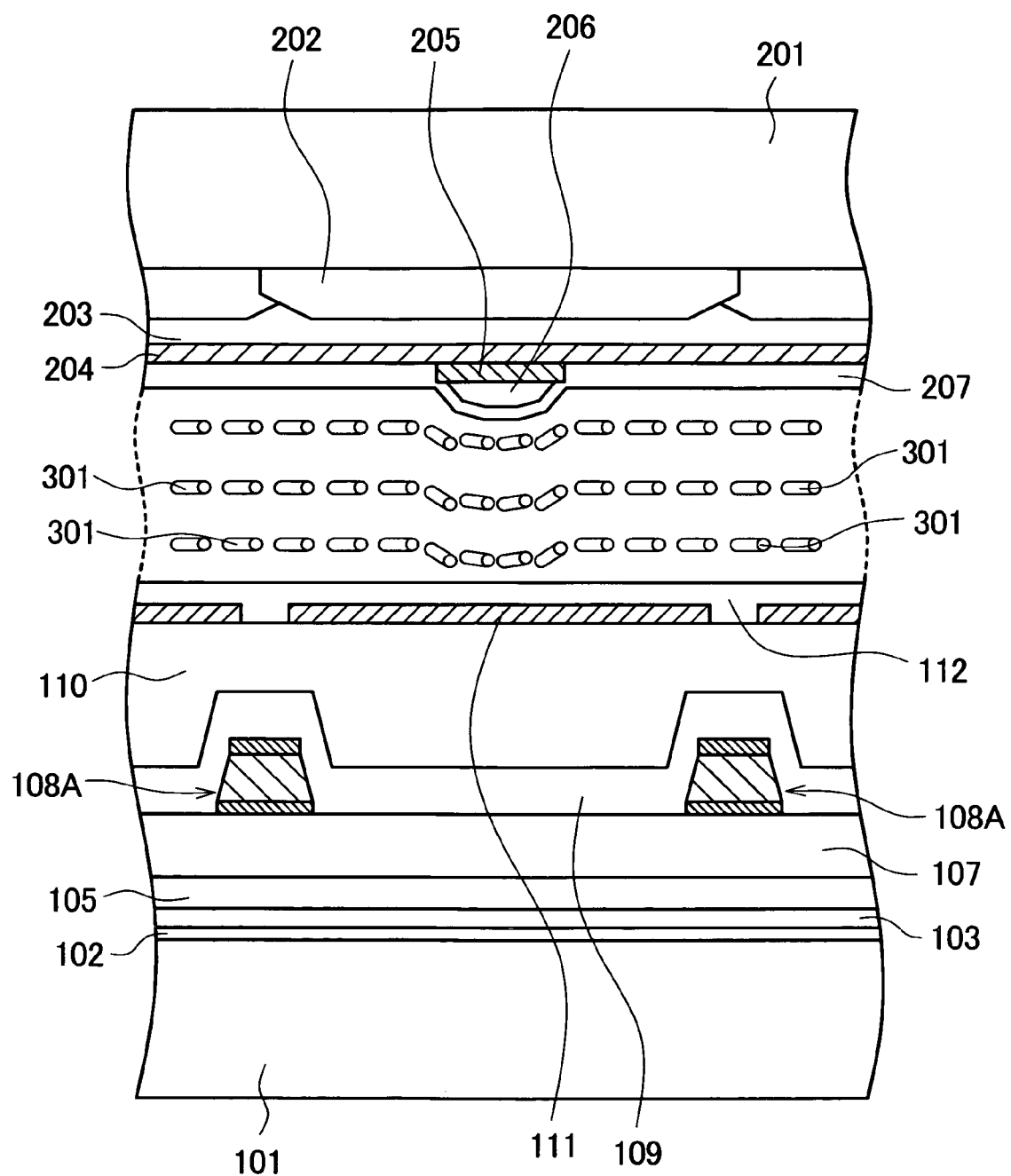
FIG. 25 is a cross-sectional view taken along a line M-M' in FIG. 24 and also is a view showing the orientation of the liquid crystal molecules when the voltage is in an OFF state.
Figure 26:
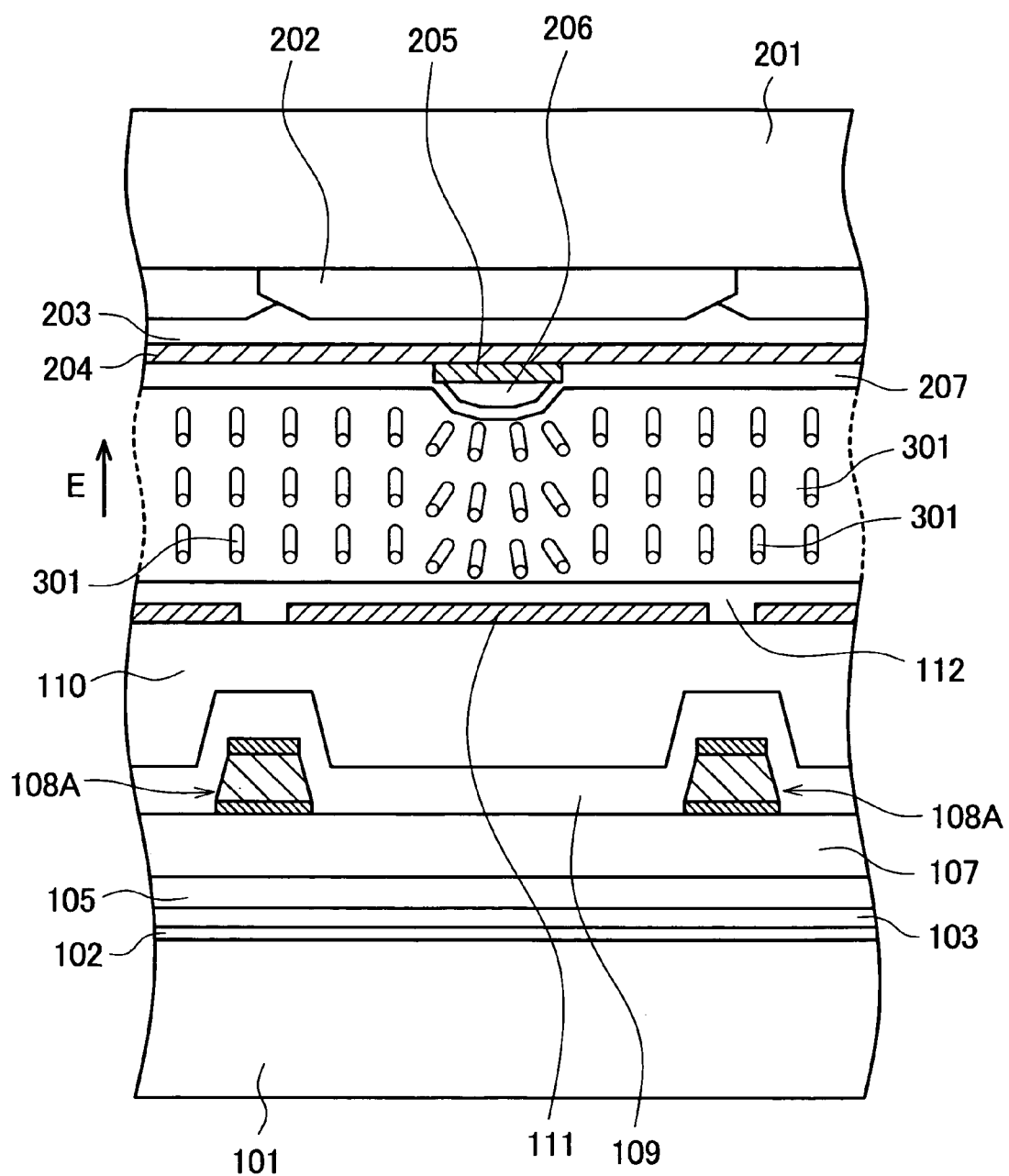
FIG. 26 is a cross-sectional view taken along a line M-M' in FIG. 24 and also is a view showing the orientation of the liquid crystal molecules when potential difference is generated between a pixel electrode and a counter electrode.

FIG. 24 to FIG. 26 are schematic views showing the schematic constitution of a liquid crystal display panel of an embodiment 7 according to the present invention, wherein FIG. 24 is a plan view showing a constitutional example of one pixel of the liquid crystal display panel of the embodiment 7, FIG. 25 is a cross-sectional view taken along a line M-M' in FIG. 24 and also is a view showing the orientation of the liquid crystal molecules when the voltage assumes an OFF state, and FIG. 26 is a cross-sectional view taken along a line M-M' in FIG. 24 and also is a view showing the orientation of the liquid crystal molecules when a potential difference is generated between the pixel electrode and the counter electrode.

In the embodiment 1 to the embodiment 6, the VA-type liquid crystal display panel, that is, the liquid crystal display panel in which when the voltage is in an OFF state and the potential difference between the pixel electrode 111 and the counter electrode 112 is 0, the liquid crystal molecules 301 are arranged perpendicular to the planar surface of the substrate is exemplified. However, the present invention is not limited to the VA-type liquid crystal display panel and is also applicable to a homogeneous orientation ECB type liquid crystal display panel which has the orientation control projections 206, for example. Accordingly, in the embodiment 7, the explanation is made with respect to a constitutional example in which the orientation control projections are provided to the ECB type transmissive color liquid crystal display panel.

Here, the basic constitution of the TFT substrate 1 and the counter substrate 2 of the ECB type transmissive liquid crystal display panel is substantially equal to the basic constitution of the TFT substrate 1 and the counter substrate 2 of the VA-type transmissive liquid crystal display panel and hence, the detailed explanation of the TFT substrate 1 and the counter substrate 2 is omitted. Further, in the embodiment 7, a case in which the constitution of the TFT substrate 1 and the counter substrate 2 are equal to the constitution of the TFT substrate 1 and the counter substrate 2 of the liquid crystal display panel described in the embodiment 2 is exemplified as shown in FIG. 24 and FIG. 25, for example.

Here, the orientation control projections 206 and the light shielding layers 205 are formed on the counter substrate 2. Further, the outer periphery of the light shielding layer 205 is arranged outside the outer periphery of the orientation control projection 206. A method of preparing the counter substrate 2 having such a constitution is exactly as same as the method explained in conjunction with the embodiment 2 and hence, the repeated explanation is omitted.

Here, in case of the ECB-type liquid crystal display panel, with respect to the orientation films 112, 207, first of all, for example, an orientation film for ECB is printed using a resin plate on which a desired pattern is drawn as a mask, and is baked by heating in an atmosphere where a temperature is 230° C. for 10 minutes. Then, rubbing is applied in the direction perpendicular to the direction that the orientation control projections 206 extend. Here, to set pretilt angles of the orientation film 207 of the counter substrate 2 and the orientation film 112 of the TFT substrate 1 to values less than 1 degree which is recognized as the homogeneous orientation, process parameters such as a substrate feed speed, cut quantity of a rubbing cloth, a rotational speed of rubbing and the like are adjusted. Further, the pretilt directions of the orientation film 207 of the counter substrate 2 and the orientation film 112 of the TFT substrate 1 are arranged non-parallel to each other.

Further, in case of the ECB-type liquid crystal display panel, in the liquid crystal layer 3, for example, positive-type liquid crystal having the birefringence phase difference $\Delta n$ of 0.0725 is used, for example.

Further, in the ECB-type liquid crystal display panel, the upper phase difference plate 5B is formed by laminating, for example, a Z-axis phase difference plate having retardation of $\Delta n \cdot d = 110$ nm (being tilted at an angle of 45 degrees with respect to a main surface of the substrate), and a uniaxially stretched phase difference plate ($\lambda/4$ phase difference plate) having retardation of $\Delta n \cdot d = 166$ nm in order from the glass substrate 201 side of the counter substrate 2. Here, the $\lambda/4$ phase difference plate is laminated such that a lagging phase axis angle assumes 90 degrees. Further, the upper polarizer 6B is laminated such that a transmissive axis angle assumes 225 degrees.

Further, the lower phase difference plate 5A is formed by laminating, for example, a Z-axis phase difference plate having retardation of $\Delta n \cdot d = 110$ nm (being tilted at an angle of 45 degrees with respect to the main surface of the substrate), and a uniaxially stretched phase difference plate ($\lambda/4$ phase difference plate) having retardation of $\Delta n \cdot d = 119$ nm in order from the glass substrate 101 side of the TFT substrate 1. Here, the $\lambda/4$ phase difference plate is laminated such that a lagging phase axis angle assumes 180 degrees. Further, the lower polarizer 6A is laminated such that a transmissive axis angle assumes 135 degrees.

Here, the lagging phase axes of the respective phase difference plates 5A and 5B and transmissive axes of the respective polarizers 6A, 6B are indicated by angles which are measured in the counterclockwise direction using a predetermined direction, for example, the horizontal direction of the screen as the reference.

In case of the ECB-type liquid crystal display panel, as shown in FIG. 25, when a voltage is in a an OFF state and a potential difference between the pixel electrode 111 and the counter electrode 204 is 0, the liquid crystal molecules 301 assume the homogeneous orientation, that is, are oriented parallel to the planar surface of the substrate. However, in the region where the orientation control projection 206 is formed, the liquid crystal molecules 301 are arranged substantially parallel to the inclined surfaces of the orientation control projection 206 (orientation film 207).

Here, since the positive-type liquid crystal is used to form the liquid crystal layer 3, when the potential difference is generated between the pixel electrode 111 and the counter electrode 204, for example, as shown in FIG. 26, the liquid crystal molecules 301 are tilted in the direction parallel to the direction of an electric field E. The direction that the liquid crystal molecules 301 are tilted is determined based on the orientation control projection 206. Further, in the region where the orientation control projection 206 is formed, the liquid crystal molecules are oriented substantially perpendicular to the inclined surfaces of the orientation control projection 206 (orientation film 207) and hence, the retardation is generated in the liquid crystal layer.

In case of the ECB type liquid crystal display panel of the embodiment 7, the white display is performed when the voltage assumes an OFF state and the black display is performed when the potential difference between the pixel electrode and the counter electrode assumes a maximum value. Accordingly, in the same manner as the VA-type liquid crystal display panel exemplified in the above-mentioned respective embodiments, leaking of light attributed to the retardation of the liquid crystal layer is generated at the time of performing the black display thus eventually lowering the transmissive contrast (white transmissivity/black transmissivity). In view of such circumstances, as in the case of the embodiment 7, by forming the light shielding layer 205 by patterning using the orientation control projection 206 as the mask, in the same manner as the liquid crystal display panel of the embodiment 2, it is possible to lower leaking of light at the time of performing the black display. Further, the size of the light shielding layer 205 can be made as small as possible and hence, it is possible to minimize lowering of transmissivity at the time of performing the white display attributed to lowering of the transmissive numerical aperture.

That is, also in the ECB-type liquid crystal display panel of the embodiment 7, it is possible to lower the black transmissivity by reducing leaking of light at the time of performing the black display and, at the same time, it is possible to minimize lowering of the white transmissivity by lowering the transmissive numerical aperture. As the result, it is possible to increase the transmissive contrast (white transmissivity/black transmissivity).

Although the present invention has been specifically explained in conjunction with the embodiments, it is needless to say that the present invention is not limited to the above-mentioned embodiments and various modifications are conceivable without departing from the gist of the present invention.

What is claimed is:

1. A liquid crystal display device having a liquid crystal display panel which sandwiches a liquid crystal material between a first substrate having a pixel electrode and a second substrate having a counter electrode, wherein the second substrate includes an orientation control projection which is formed by forming a conductive film on the second substrate, by forming an insulation film on the conductive film and, thereafter, by patterning the insulation film, and a light shielding layer which is formed by patterning the conductive film using the orientation control projection as a mask, wherein the light shielding layer has an outer periphery thereof as viewed from above a planar surface of the substrate arranged inside an outer periphery of the orientation control projection and, at the same time, a whole side surface of the outer periphery of the light shielding layer is not covered with the orientation control projection.

2. A liquid crystal display device according to claim 1, wherein the orientation control projection and the light shielding layer are arranged between the counter electrode and the pixel electrode.

3. A liquid crystal display device according to claim 1, wherein the counter electrode is formed of a conductive film which is formed after patterning the light shielding layer.

4. A liquid crystal display device according to claim 1, wherein the outer periphery of the light shielding layer is spaced apart from the outer periphery of the orientation control projection with a substantially fixed distance therebetween at respective points of the outer periphery of the light shielding layer.

5. A liquid crystal display device according to claim 1, wherein in the liquid crystal display panel, when a potential difference between the pixel electrode and the counter electrode is 0 (zero), liquid crystal molecules in the liquid crystal material are oriented in the direction perpendicular to a planar surface of the substrate.

* * * * *